US007614476B2

(12) United States Patent
Seki

(10) Patent No.: US 7,614,476 B2
(45) Date of Patent: Nov. 10, 2009

(54) DRIVE POWER TRANSMITTING SYSTEM

(75) Inventor: Bunzo Seki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 459 days.

(21) Appl. No.: 10/599,442

(22) PCT Filed: Mar. 25, 2005

(86) PCT No.: PCT/JP2005/006434

§ 371 (c)(1),
(2), (4) Date: Oct. 6, 2006

(87) PCT Pub. No.: WO2005/095142

PCT Pub. Date: Oct. 13, 2005

(65) Prior Publication Data

US 2007/0178977 A1    Aug. 2, 2007

(30) Foreign Application Priority Data

Mar. 30, 2004   (JP)   ............................ 2004-101242
Mar. 1, 2005    (JP)   ............................ 2005-056003

(51) Int. Cl.
*B60K 17/00*   (2006.01)
*F16D 3/00*    (2006.01)
(52) U.S. Cl. .................. 180/373; 180/383; 464/139
(58) Field of Classification Search ......... 180/371–373, 180/376, 380, 383–385; 464/140, 172, 170, 464/906, 139
See application file for complete search history.

(56) References Cited

U.S. PATENT DOCUMENTS

| 1,103,716 A | * | 7/1914 | Wallbillioh | ................. 464/140 |
|---|---|---|---|---|
| 1,838,310 A | * | 12/1931 | Hubbel | ........................ 464/15 |
| 3,218,827 A | | 11/1965 | Aucktor | |
| 4,112,709 A | * | 9/1978 | Krude | ........................ 464/117 |
| 4,300,651 A | | 11/1981 | Krude | |
| 5,007,154 A | | 4/1991 | Kamata et al. | |
| 5,575,352 A | * | 11/1996 | Suzuki et al. | ............... 180/311 |
| 5,725,453 A | | 3/1998 | Zalewski et al. | |
| 5,951,401 A | | 9/1999 | Kita et al. | |
| 6,280,336 B1 | | 8/2001 | Sone et al. | |
| 7,232,000 B2 | * | 6/2007 | Brossard | ..................... 180/256 |
| 2003/0236122 A1 | | 12/2003 | Blumke et al. | |
| 2004/0011584 A1 | | 1/2004 | Henkel et al. | |
| 2007/0045015 A1 | * | 3/2007 | Yamamoto et al. | ......... 180/68.5 |
| 2007/0066429 A1 | * | 3/2007 | Seki et al. | ................... 474/112 |

FOREIGN PATENT DOCUMENTS

| DE | 19755307 | 2/1999 |
|---|---|---|
| JP | 60-72304 | 5/1985 |

* cited by examiner

*Primary Examiner*—Paul N Dickson
*Assistant Examiner*—Drew Brown
(74) *Attorney, Agent, or Firm*—Rankin, Hill & Clark LLP

(57) ABSTRACT

A drive power transmitting system for a rough-terrain traveling vehicle (10) includes a pair of drive shafts (177, 178) for transmitting drive power from a power unit (18) to respective right and left independently suspended rear wheels (21, 21). Right and left constant velocity joints (184, 184) are provided on respective opposed ends of the drive shafts. A bearing unit (176) is provided on each constant velocity joint for connecting the same to a final gearcase (133) provided on a vehicle body so that the left and right constant velocity joints are releasably connected to the final gearcase individually.

12 Claims, 15 Drawing Sheets

DRIVE POWER TRANSMITTING SYSTEM

TECHNICAL FIELD

The present invention relates to a drive power transmitting system for a vehicle.

BACKGROUND ART

Known drive power transmitting systems for vehicles include chain-driven front wheel drive shafts and constant velocity joints connecting the front wheel drive shafts to front wheels, as disclosed in JP-U-60-72304.

A front wheel drive shaft disclosed in JP-U-60-72304 has a tubular shape and is rotatably supported by a case via a plurality of roll bearings. The drive shaft serves as an outer ring of a constant velocity joint.

Ball joint units are swingably connected to opposite ends of an inner peripheral portion of the front wheel drive shaft. Each ball joint unit is connected to a front wheel via a relay axle. A sprocket is attached to an outer peripheral portion of the front wheel drive shaft.

When a tread or distance between the left and right front wheels is reduced, a joint angle or an angle between the ball joint unit and the front wheel drive shaft inevitably becomes large with the result that the front wheel can not vertically move by a large amount. If a distance between the left and right ball joint units is made small, the joint angle can be made small even when the tread is reduced. As a result, the amount of vertical movement of the front wheels can be increased.

Further, it is troublesome to assemble to a case the front wheel drive shaft previously assembled with the left and right ball joint units connected to the left and right relay axles.

Furthermore, for removal of the sprocket from the front wheel drive shaft, it is necessary to remove from the case an assembly composed of the front wheel drive shaft, the left and right ball joint units and the left and right relay axles and then to remove the ball joint units and the relay axles from the front wheel drive shaft. Such a removing operation would adversely affect maintenance of the sprocket.

There is a demand for a drive power transmitting system for a vehicle capable of being assembled and undergoing maintenance operation more efficiently as well as providing a small joint angle of the constant velocity joint for improving transmission efficiency.

DISCLOSURE OF THE INVENTION

According to one aspect of the present invention, there is provided a drive power transmitting system for a vehicle, comprising: a pair of drive shafts for transmitting drive power from a source of drive power to left and right independently suspended wheels; right and left constant velocity joints connected to respective opposed ends of the drive shafts; and a case provided on a vehicle body, wherein the right and left constant velocity joints are supported by the case and designed to be individually releasably connected to the vehicle body.

Because the left and right constant velocity joints are supported by the case provided to the vehicle body and can be individually attached to and detached from the vehicle body, the constant velocity joints can come near to each other and the drive shafts can increase in length to thereby allow the independent suspension to operate over a large stroke. Therefore, the vehicle can travel more satisfactorily. Further, the left and right constant velocity joints can be separately assembled to the case. Thus, the constant velocity joints can be more efficiently assembled to the case. Furthermore, because the left and right constant velocity joints can be separately attached to and detached from the vehicle body, the constant velocity joints can separately undergo maintenance operations. Thus, the maintenance operations to be performed on the constant velocity joints are improved.

Preferably, the power transmitting system further comprises connecting units provided on the left and right constant velocity joints for connecting the respective constant velocity joints to the case such that the constant velocity joints are removably connected to the case individually.

Since the left and right constant velocity joints are connected to the case by the connecting units and can be individually connected to and disconnected from the case, the left and right constant velocity joints can come close to each other and the drive shafts can be lengthened to thereby allow the independent suspension to operate over a large stroke. Thus, the vehicle can travel more satisfactorily. Further, the connecting units can be individually assembled to the case. Furthermore, the connecting units can be individually attached to and detached from the case for undergoing maintenance operation.

Desirably, the drive power transmitting system further comprises a driven sprocket to which the drive power from the drive power source is transmitted, the driven sprocket being provided astride the right and left constant velocity joints.

By virtue of the left and right constant velocity joints, therefore, there can be improved support for the driven sprocket to which the drive power from the drive power source is applied. Accordingly, the drive power is reliably transmitted to the driven sprocket.

Preferably, each of the constant velocity joints includes a housing forming part of the constant velocity joint, and each of the connecting units includes a tubular member detachably supported by the case, a bearing fixed within the tubular member for rotatably supporting the housing and sealing members disposed on both sides of the bearing for sealing between the tubular member and the housing.

The connecting unit can be assembled prior to attachment to the case. Such a pre-assembled connecting unit can be easily attached to and detached from the case. Thus, the connecting units can be assembled to the case with improved efficiency. Moreover, because the sealing members cover both sides of the bearing, the sealing members prevent the bearing from being exposed to mud or dust.

Desirably, the drive power transmitting system further comprises a driven sprocket to which the drive power from the drive power source is transmitted, the left and right housings being disposed in close proximity to each other and have outer peripheral portions, the driven sprocket being detachably connected to the outer peripheral portions of the housings.

Since the driven sprocket is detachably connected to the outer peripheral portions of the left and right housings, the driven sprocket can be easily attached to and detached from the left and right housings. Accordingly, the driven sprocket can undergo maintenance operation with improved efficiency.

Additionally, the left and right housings support the driven sprocket. Thus, there is no need for an additional particular member for supporting the driven sprocket. Therefore, the number of components for the drive power transmitting system can be reduced. The driven sprocket can be disposed in the vicinity of a boundary between the left housing and the right housing. Thus, the left and right housings can bear approximately the same burden of supporting the driven sprocket.

Preferably, the housings are cup-shaped members having the outer peripheral portions detachably connected to the driven sprocket, the cup-shaped housing having a bottom, the constant velocity joint having one part pivotably connected to the inside of the housing in such a manner as to allow the housing to slide relative to the one part in an axial direction of the housing, the driven sprocket having engaging areas engaging the housings, a distance between the bottom of the cup-shaped housing and the one part of the constant velocity joint being larger than a length of each engaging area of the driven sprocket.

By moving towards the one part held stationary, each of the left and right housings is detached from the driven sprocket. Thus, the driven sprocket can be easily attached to and detached from the housings for undergoing maintenance operation with improved efficiency.

Desirably, the driven sprocket is provided transversely centrally of the vehicle in lined relation to a crankshaft center within the drive power source provided on the vehicle body.

With this arrangement, weights of left and right parts of the vehicle body can be satisfactorily balanced with each other.

Preferably, the driven sprocket has an engagement portion engageable with a tool from a lateral side thereof to retain the driven sprocket in the case when the driven sprocket is connected to the housings.

Thus, when the driven sprocket is assembled to the housings, the tool can be brought from the lateral side of the driven sprocket into engagement with the engagement portion of the driven sprocket. Accordingly, the driven sprocket can be easily assembled to the housings.

Desirably, the engagement portion of the driven sprocket has a plurality of holes formed therein, the driven sprocket being retained in the case by insertion of the tool through the holes formed in the engagement portion and through a plurality of the holes formed in the case.

Since the plural holes are formed in the driven sprocket as well as in the case, the holes through which the tool is to be inserted can be selected from the plural holes. Therefore, the tool can be easily inserted through the holes.

Preferably, the case has a lower portion supported by a pair of left and right under frames provided on the vehicle body, the drive power from the drive power source being transmitted to a driven sprocket disposed in the vicinity of the left and right under frames and above a space defined between the left and right under frames.

Because the case is supported by the pair of left and right under frames and the driven sprocket is disposed in the vicinity of the under frames, the case to which the drive power is applied can be securely supported by the under frames. In addition, since the driven sprocket is disposed in the vicinity of the under frames, the driven sprocket can be securely supported by the under frames even if the driven sprocket undergoes a great drive power.

Desirably, the drive shafts are connected to a pair of left and right rear wheels, the vehicle being designed to travel on a rough terrain, the independent suspension comprising a double wishbone independent suspension which includes upper and lower arm members.

Thus, the suspension can be set more freely in the vehicle. With the suspension, the vehicle can be driven with increased comfortableness.

Preferably, the case includes a left case member for connecting the left constant velocity joint to the vehicle body, and a right case member for connecting the right constant velocity joint to the vehicle body, the left and right constant velocity joints being capable of being individually connected to and disconnected from the vehicle body.

Because the left and right constant velocity joints can be individually connected to and disconnected from the vehicle body, the left and right constant velocity joints can come near to each other and the drive shafts can increase in length for allowing the suspension to operate over a large stroke. Thus, the vehicle can travel more satisfactorily. Further, the left and right constant velocity joints can be individually assembled to the vehicle body. Furthermore, the left and right constant velocity joints can be individually connected to and disconnected from the vehicle body for maintenance operation.

Desirably, the constant velocity joints include housings having left and right extending portions each provided at one end of the housing for supporting a driven sprocket to which the drive power from the drive power source is transmitted.

With this arrangement, the extending portion can be smaller in outer diameter than other portions of the housing. Thus, the housing can provide a small portion for connection to the driven sprocket. Moreover, the driven sprocket can be located in the vicinity of a boundary between the left and right housings. Therefore, the left and right housings can bear approximately the same burden of supporting the driven sprocket.

Preferably, the left and right constant velocity joints include left and right housings having left and right extending portions each provided at one end of the housing for supporting a driven sprocket to which the drive power from the drive power source is transmitted, the left and right housings being leftward and rightward slidable relative to the left and right case members, respectively, the extending portion having a length smaller than a slide distance of the housing.

When the left housing is moved towards one part of the left constant velocity joint with the one part held stationary within the left housing, the extending portion can be disengaged or detached from the driven sprocket. Similarly, when the right housing is moved towards one part of the right constant velocity joint with the one part held stationary within the right housing, the extending portion can be disengaged or detached from the driven sprocket. Otherwise, when the left and right housings are moved away from the parts of the constant velocity joints, the extending portions can be easily attached to the driven sprocket.

BEST MODE FOR CARRYING OUT THE INVENTION

Figure 1:
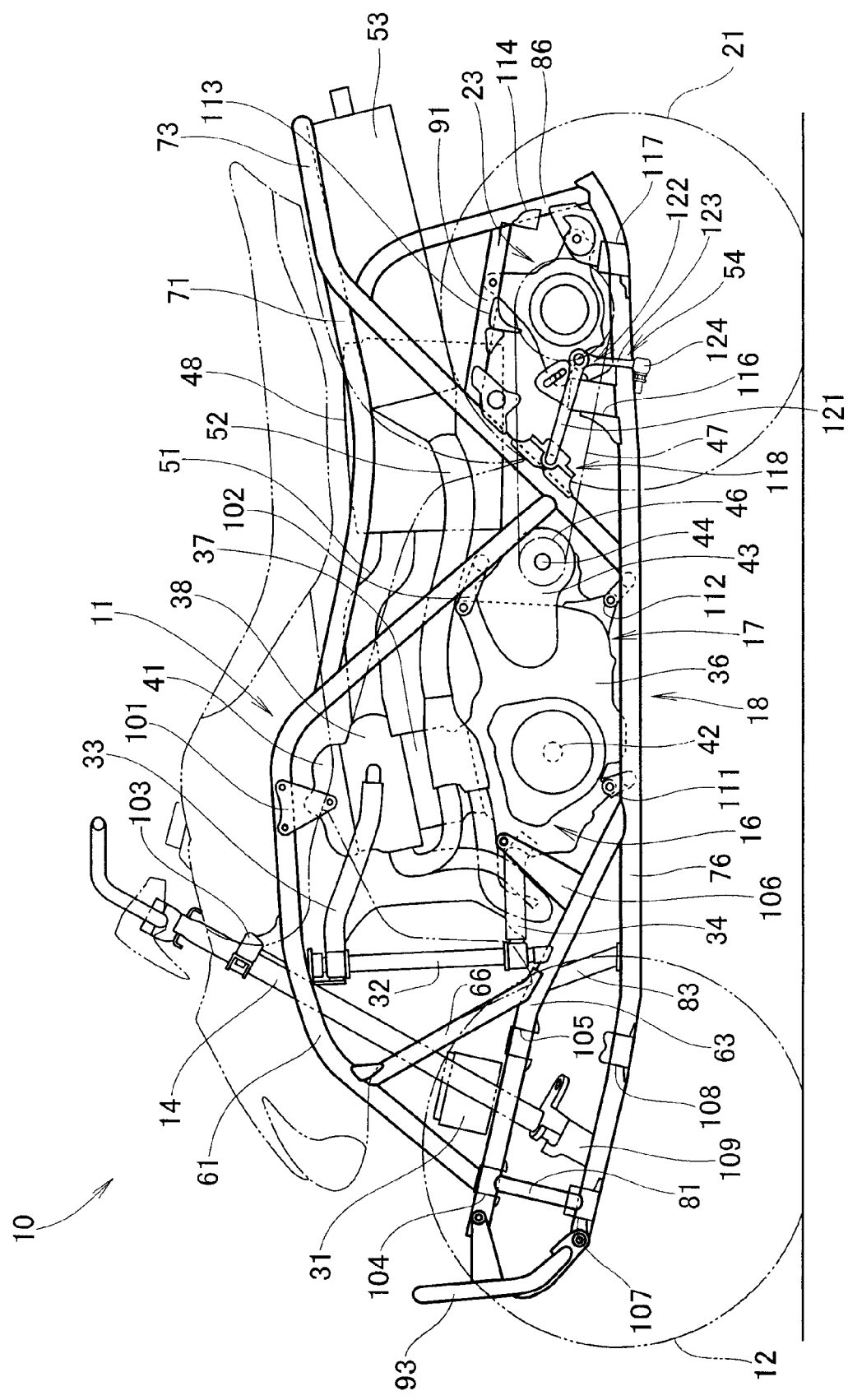
FIG. 1 is a side elevation view of a rough-terrain traveling vehicle according to the present invention.

Referring to FIG. 1, there is shown a rough-terrain traveling vehicle according to the present invention. The rough-terrain traveling vehicle 10 includes a steering shaft 14 for steering left and right front wheels 12, 12 (only one shown) mounted to a front portion of a vehicle body frame 11, a power unit 18 including an engine 16 and a transmission 17 mounted to a center portion of the vehicle body frame 11, a drive power transmitting mechanism 23 mounted to a rear portion of the vehicle body frame 11 for transmitting a drive power to left and right rear wheels 21, 21 (only one shown), and double wishbone independent suspensions provided for the front wheels 12, 12 and the rear wheels 21, 21.

The vehicle 10 further includes a battery 31, a radiator 32, radiator hoses 33, 34 connected to the radiator 32 and the engine 16, a crankcase 36, a cylinder block 37, a cylinder head 38, a head cover 41, a crankshaft 42, a speed-reducer unit 43 having an output shaft 44 and provided to the transmission 17, a drive sprocket 46 mounted to the output shaft 44, a chain 47 wound around the drive sprocket 46, an air cleaner 48 connected to the cylinder head 38 via a connecting tube 51, an exhaust pipe 52 extending rearward from the cylinder head 38, a muffler 53 connected to a rear end of the exhaust pipe 52, and an anti-roll bar device 54 extending between left and right suspension arms (more specifically, upper arms and lower arms which are not shown in FIG. 1) provided for the left and right rear wheels 21, 21.

The vehicle body frame 11 includes a pair of left and right front upper frames 61, 61 (only one shown) bent into a generally inverted U-shaped configuration, a pair of left and right front middle frames 63, 63 (only one shown), a pair of left and right front first inclined frames 66, 66 (only one shown), a pair of left and right rear upper frames 71, 71 (only one shown), a pair of left and right rear inclined frames 73, 73 (only one shown), a pair of left and right lower frames 76, 76 (only one shown), a pair of left and right front lower first frames 81, 81 (only one shown), a pair of left and right front lower second frames 83, 83 (only one shown), a pair of left and right rear vertical frames 86, 86 (only one shown), and a pair of left and right rear sub-frames 91, 91 (only one shown).

The left and right front middle frames 63, 63 are connected to front ends of the front upper frames 61, 61. The left and right front first inclined frames 66, 66 extend obliquely upwardly from middle portions of the front middle frames 63, 63 to front portions of the front upper frames 61, 61. The left and right rear upper frames 71, 71 extend rearward from middle portions of the front upper frames 61, 61. The left and right rear inclined frames 73, 73 are connected to rear ends of the front upper frames 61, 61 and to rear ends of the rear upper frames 71, 71. The left and right lower frames 76, 76 extend in the fore-and-aft direction, and are connected to rear ends of the front middle frames 63, 63 and to lower ends of the rear inclined frames 73, 73. The left and right front lower first frames 81, 81 extend between front portions of the front middle frames 63, 63 and front portions of the lower frames 76, 76. The left and right rear vertical frames 86, 86 extend substantially vertically between rear end portions of the lower frames 76, 76 and the rear inclined frames 73, 73. The left and right rear sub-frames 91, 91 extend between the rear vertical frames 86, 86 and the rear inclined frames 73, 73. A front guard member 93 is attached to front ends of the front middle frames 63, 63 and front ends of the lower frames 76, 76.

Attached to the front upper frames 61, 61 are a first bracket 101 and a second bracket 102 which support the power unit 18. Also, attached to the front upper frames 61, 61 is a steering shaft upper portion supporting member 103 which supports the upper portion of the steering shaft 14.

The front middle frames 63, 63 each have upper arm supporting portions 104, 105 by which an upper arm (not shown) supporting the front wheel 12 is vertically swingably supported. Also, the front middle frames 63, 63 are each provided with a third bracket 106 supporting the power unit 18.

The lower frames 76, 76 each have, at a front part thereof, lower arm supporting portions 107, 108 by which a lower arm (not shown) supporting the front wheel 12 is vertically swingably supported. Also, attached to each front portion of the lower frames 76, 76 is a steering shaft lower portion supporting member 109 supporting the lower portion of the steering shaft 14. At each middle portion of the lower frames 76, 76, there are provided a fourth bracket 111 and a fifth bracket 112 both of which support the power unit 18.

The rear sub-frames 91, 91 each have upper arm supporting portions 113, 114 by which an upper arm (not shown) supporting the rear wheel 21 is vertically swingably supported.

The lower frames 76, 76 each have lower arm supporting portions 116, 117 by which a lower arm (not shown) supporting the rear wheel 21 is vertically swingably supported.

The anti-roll bar device 54 includes anti-roll bar bodies 121 vertically swingably attached to the rear inclined frames 73, 73 via bar supporting members 118, 118 (only one shown), and link mechanisms 122 each connected to an end of the anti-roll bar body 121. The respective link mechanisms 122 have distal ends connected to the left and right lower arms.

The link mechanism 122 includes a bar-shaped link body 123, and ball joints 124, 124 (only one shown) provided at both ends of the link body 123.

Figure 2:
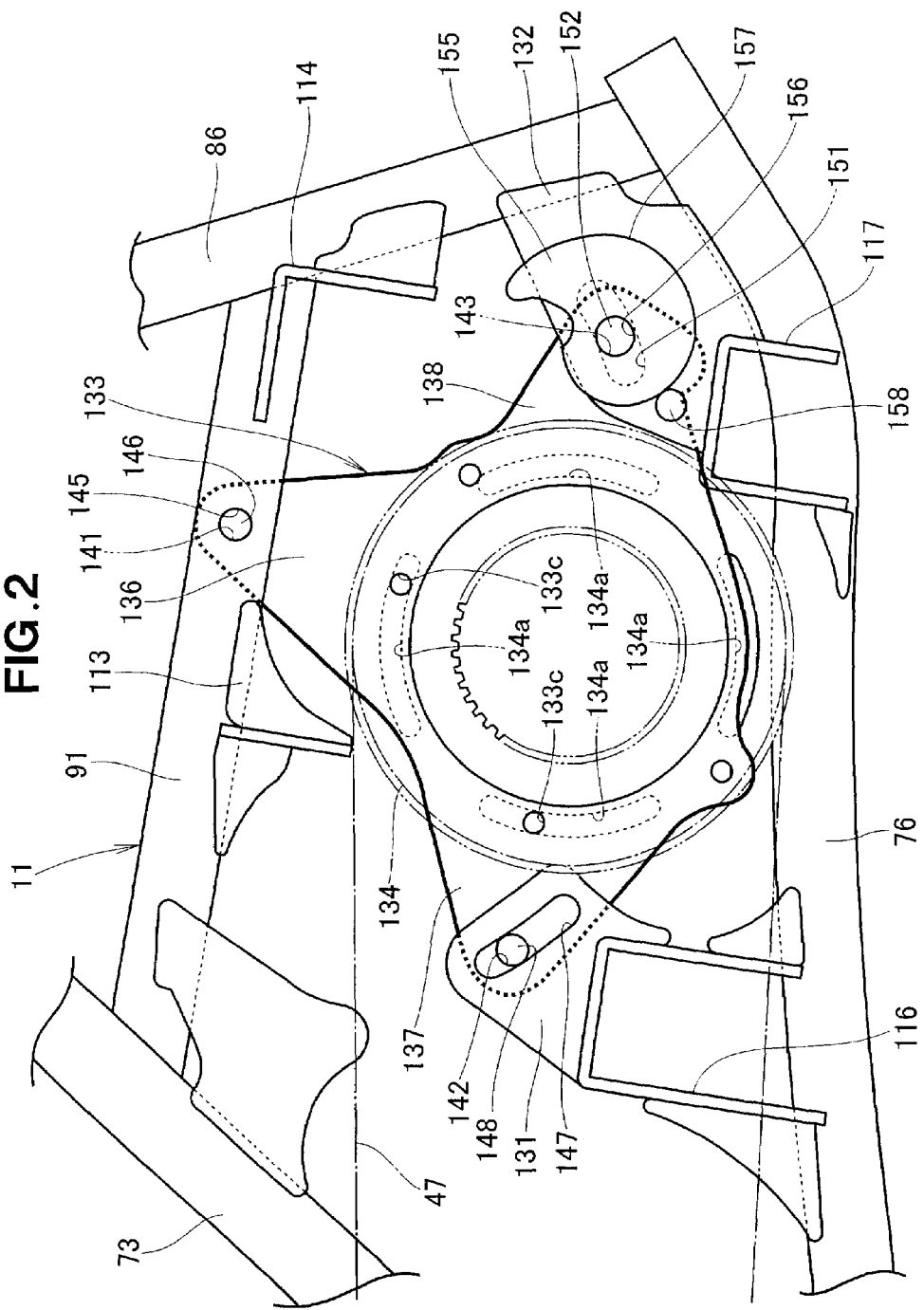
FIG. 2 is a side elevation view of a drive power transmitting unit according to a first embodiment of the present invention.

Reference is made to FIG. 2. Right and left case supporting brackets 131, 131 (only one shown) are each attached to the rear wheel lower arm supporting portion 116 for the rear wheel. Right and left case supporting brackets 132, 132 (only one shown) are each attached to the rear end of the lower arm supporting portion 117 for the rear wheel, to the rear end of each of the lower frames 76, 76 (only one shown), and to each of the rear vertical frames 86, 86 (only one shown). The rear sub frames 91, 91 (only one shown) and the case supporting brackets 131, 131, 132, 132 support a final gearcase 133 (having an outline shown by a bold line). The aforementioned chain 47 is wound around a driven sprocket 134 rotatably supported by the final gearcase 133.

The final gearcase 133 includes three arm portions 136, 137, 138 having bolt insertion holes 141, 142, 143 formed therethrough. The bolt insertion hole 141 is aligned with mounting holes 145 formed through the rear sub-frames 91, 91. A mounting bolt 146 passes through the bolt insertion hole 141 and the mounting holes 145 and has a tip end portion onto which a nut (not shown) is tightened. The bolt insertion hole 142 is aligned with arcuate elongated holes 147 formed through the case supporting brackets 131, 131. A mounting bolt 148 passes through the bolt insertion hole 142 and the arcuate elongated holes 147, 147 and has a tip end portion onto which a nut (not show) is tightened. The bolt insertion hole 143 is aligned with arcuate elongated holes 151 formed through the case supporting bracket 132, 132. A mounting bolt 152 passes through the bolt insertion hole 143 and the arcuate elongated holes 151 and has a tip end portion onto which a nut (not shown) is tightened. With this arrangement, the final gearcase 133 is mounted to the vehicle body frame 11.

Snail cams 155, 155 (only one shown) each has a hole 156 into which the mounting bolt 152 is fitted in such a manner as to allow rotational movement of the snail cam 155. A distance from the center of a hole 156 and an outer peripheral surface 157 of the snail cam 155 varies gradually. The outer peripheral surface 157 partly abuts against pins 158 mounted to the case supporting brackets 132, 132. Therefore, it becomes possible to swing the final gearcase 133 in the fore-and-aft direction about the mounting bolt 146 by loosening threaded engagements between the nuts and the corresponding mounting bolts 146, 148, 152 and then turning the snail cams 155, 155. The swing movement of the snail cams 155, 155 causes the driven sprocket 134 to move in the fore-and-aft direction for adjusting a tension in the chain 47.

Figure 3:
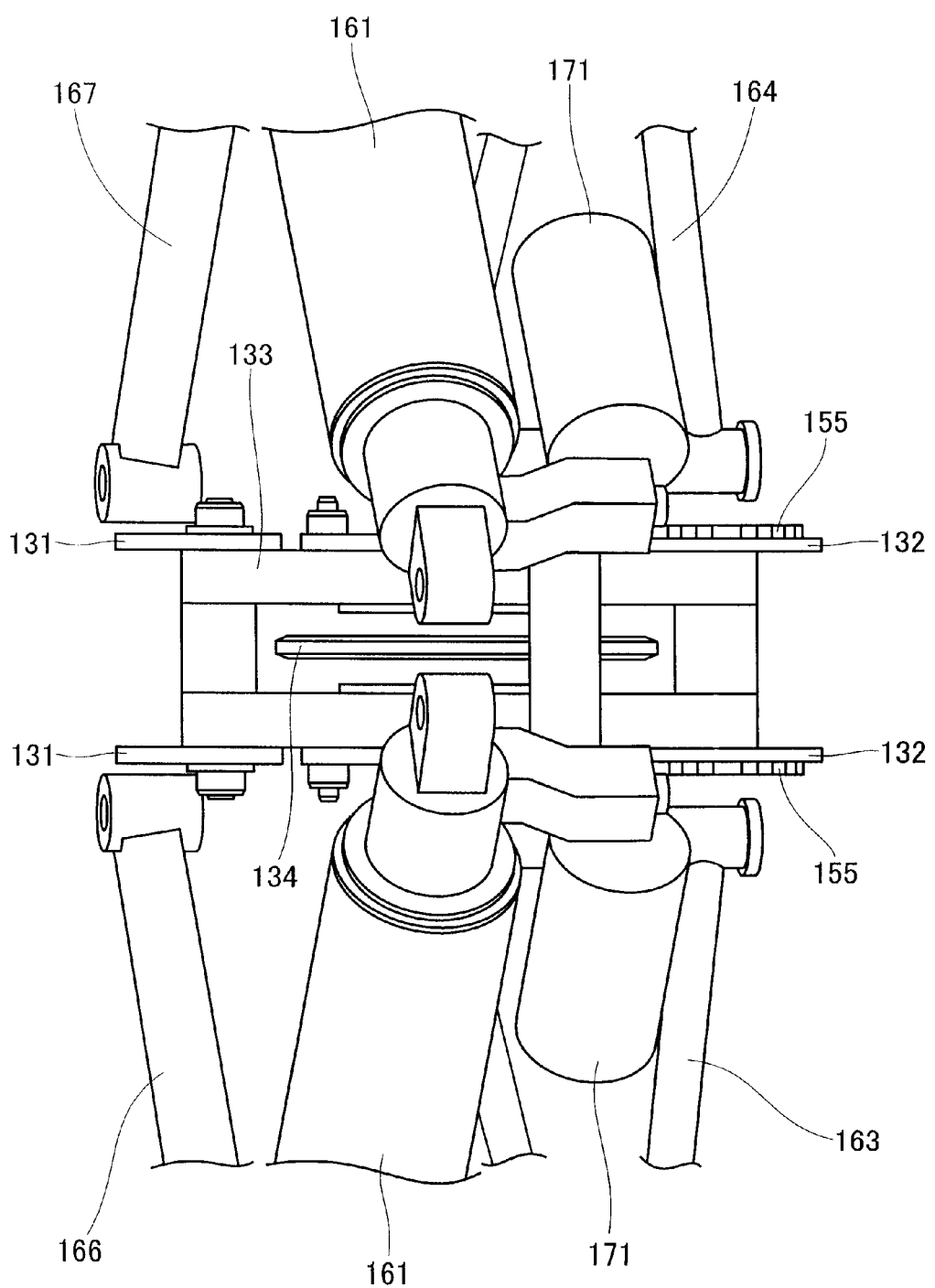
FIG. 3 is a plan view of a rear portion of the vehicle.

As shown in FIG. 3, the final gearcase 133 has a front portion attached to the left and right case supporting brackets 131, 131. The final gearcase 133 has a rear portion attached to the left and right case supporting brackets 132, 132. The snail cams 155, 155 are disposed outside the case supporting brackets 132, 132. The driven sprocket 134 is disposed in the final gearcase 133. Rear cushion units 161, 161 each have an upper end portion attached to the vehicle body frame 11 (see FIG. 1), and a lower end portion attached to the lower arm. The left and right upper arms designated at 163, 164 are provided for the rear wheels and the left and right lower arms designated at 166, 167 are provided for rear wheels.

The rear cushion units 161, 161 are integrally connected to reserve tanks 171 within which oil to flow in and out from cylinders is stored.

Figure 4:
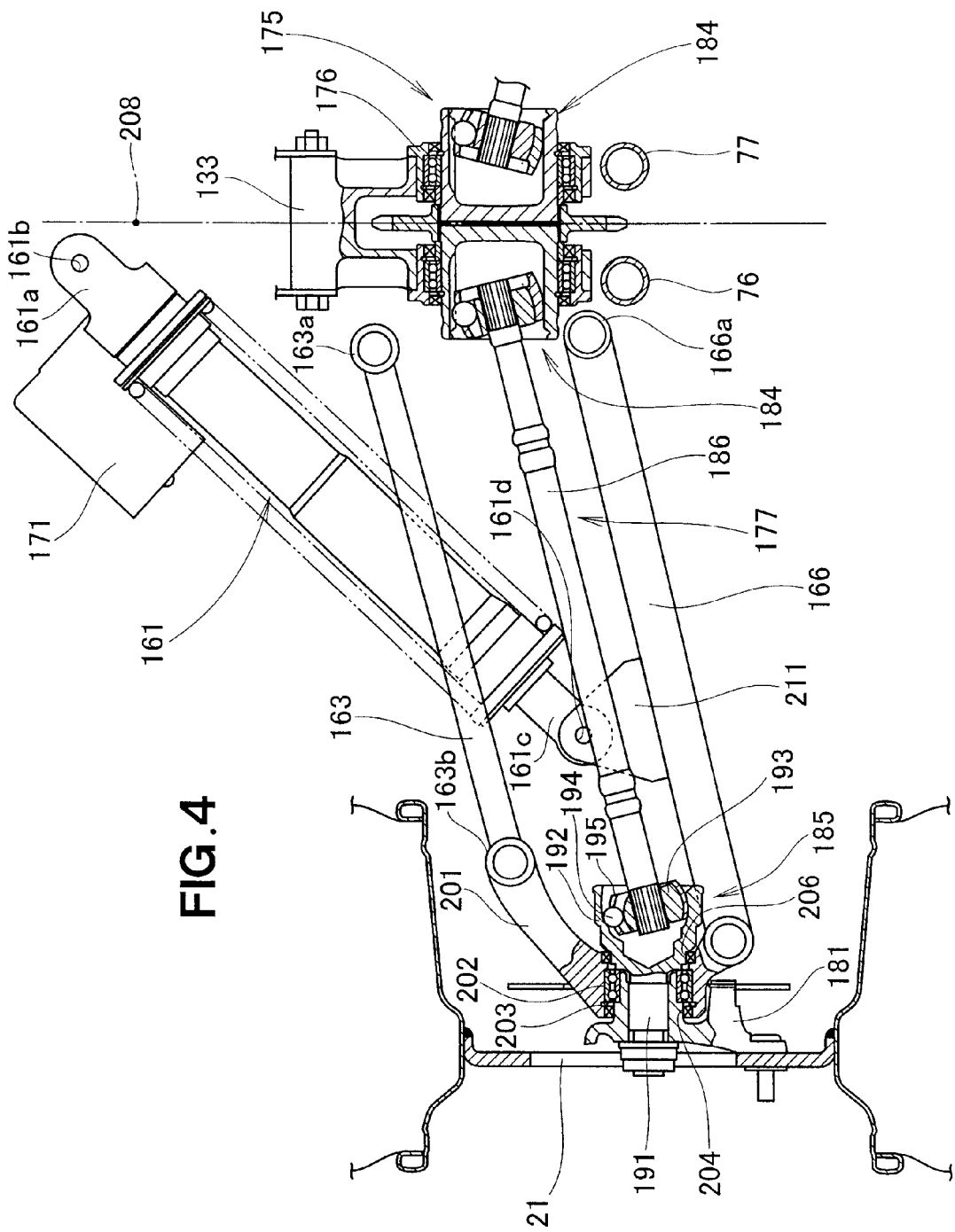
FIG. 4 is a rear elevation view of the drive power transmitting unit, shown in FIG. 2, with portions of the unit shown in cross-section.

With reference to FIG. 4, a drive power transmitting unit 175 according to a first embodiment of the present invention includes the aforementioned drive sprocket 46 (see FIG. 1), the chain 47, the final gearcase 133, a bearing unit 176 supported by the final gearcase 133, left and right drive shafts 177, 178 (only one designated at 177 is shown) each having one end supported by the bearing unit 176, and hubs 181, 181 (only one shown) each connected to the opposite end of each of the drive shafts 177, 178. The rear wheels 21, 21 (only one shown) are mounted to the hubs 181, 181.

The drive shaft 177 includes a shaft 186. The shaft 186 is connected at one end to a sliding-type constant velocity joint 184 connected to the bearing unit 176. The constant velocity joint 184 is swingable and can axially expand and contract. The shaft 186 is connected at the opposite end to a swingable fixed-type constant velocity joint 185 connected to the hub 181. The shaft 186 is provided between the constant velocity joints 184, 185. The right drive shaft 178 has the same structure as the left drive shaft 177, and hence its description will be omitted. The constant velocity joint 184 will be described later.

The constant velocity joint 185 includes an outer ring 192 formed integrally with an axle 191 of the rear wheel 21, an inner ring 193 spline-connected to the one end of the shaft 186, a plurality of balls 194 movably disposed both in a plurality of ball grooves provided on an inner peripheral surface of the outer ring 192 and in a plurality of ball grooves provided on an outer peripheral surface of the inner ring 193, and a cage 195 retaining the balls 194.

Knuckle arms 201, 201 (only one shown) are connected to respective distal ends of the upper arms 163, 164 (only one designated at 163 is shown) and to respective distal ends of the lower arms 166, 167 (only one designated at 166 is shown). The knuckle arm 201 rotatably supports the constant velocity joint 185 via a bearing 202. A retaining ring 203 is provided for fixing the bearing 202. Reference numerals 204, 206 denote sealing members.

The rear cushion units 161 has a mounting portion 161a having a mounting hole 161b to be mounted to the vehicle body frame 11 (see FIG. 1). The mounting portion 161a, more specifically, the mounting hole 161b is disposed more closely to a center of the vehicle (a vertical line 208 represents the widthwise center of the vehicle) than mounting portions 163a, 166a of the upper and lower arms 163, 166 to be mounted to the vehicle body frame 11.

Attached to the lower arms 166, 167 are cushion mounting brackets 211, 211 (only one shown) each mounted at an upper portion to a mounting portion 161c of the rear cushion units 161.

The upper arm 163 and the lower arm 166 shown in FIG. 4 are in a state where the rear wheels 21, 22 are in contact with the ground and a human driver is not on the vehicle. This state is referred to as an empty state.

In such an empty state, the mounting portions 161c, more specifically, mounting holes 161d of the rear cushion units 161 each overlaps the shaft 186 of the drive shaft 177, as viewed in rear elevation.

Figure 5:
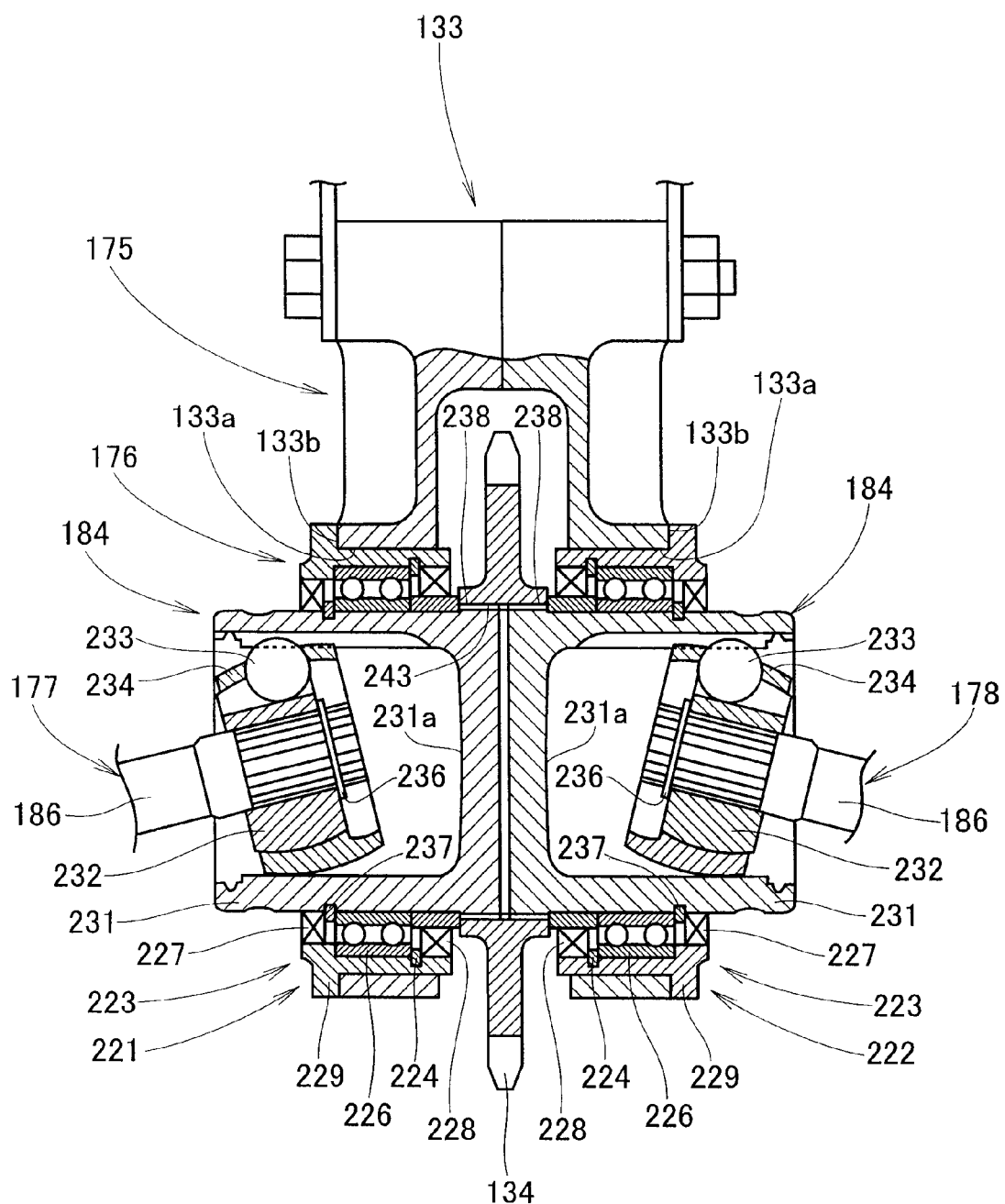
FIG. 5 is a cross-sectional view of the drive power transmitting unit according to the first embodiment of the present invention.

As shown in FIG. 5, the bearing unit 176 of the drive power transmitting unit 175 includes a left bearing unit 221 and a right bearing unit 222. The left bearing unit 221 and the right bearing unit 222 are symmetrically disposed and have the same structure. Therefore, only the left bearing unit 221 will be described below.

The left bearing unit 221 includes a tubular member 223 detachably inserted through a fitting hole 133a of the final gearcase 133 divided into left and right halves, a bearing 226 fitted with an inner peripheral surface of the tubular member 223 and prevented by a retaining ring 224 from coming out of the tubular member 223, and sealing members 227, 228 interposed between the tubular member 223 and the constant velocity joint 184.

The tubular member 223 has a flange 229 at an end thereof. The flange 229 abuts against a side surface 133b of the final gearcase 133 and is mounted to the side surface 133b of the final gearcase 133 by a bolt (not shown).

The constant velocity joint 184 includes a housing 231 acting as an outer ring, an inner ring 232 spline-connected to the end of the shaft 186, a plurality of balls 233 movably disposed both in a plurality of ball grooves provided on the inner peripheral surface of the housing 231 and in a plurality of ball grooves provided on the outer peripheral surface of the inner ring 232, and a cage 234 retaining these balls 233. Reference numeral 236 denotes a retaining ring for preventing the inner ring 232 from coming off the shaft 186.

The housing 231 is a tubular member having a bottom. The housing 231 has an outer peripheral surface fitted with the bearing 226 of the left bearing unit 221. The housing 231 is prevented by a retaining ring 237 from coming away from the bearing 226. The housing 231 has male splines 238 formed on an end portion of the outer peripheral surface. The bottom of the housing 231 has a bottom surface 231a.

When the left and right tubular members 223, 223 are mounted to the final gearcase 133, the left and right housings 231, 231 are positioned close to each other. The male splines 238 of the housing 231, 231 engage female splines 243 of the driven sprocket 134.

Figure 6:
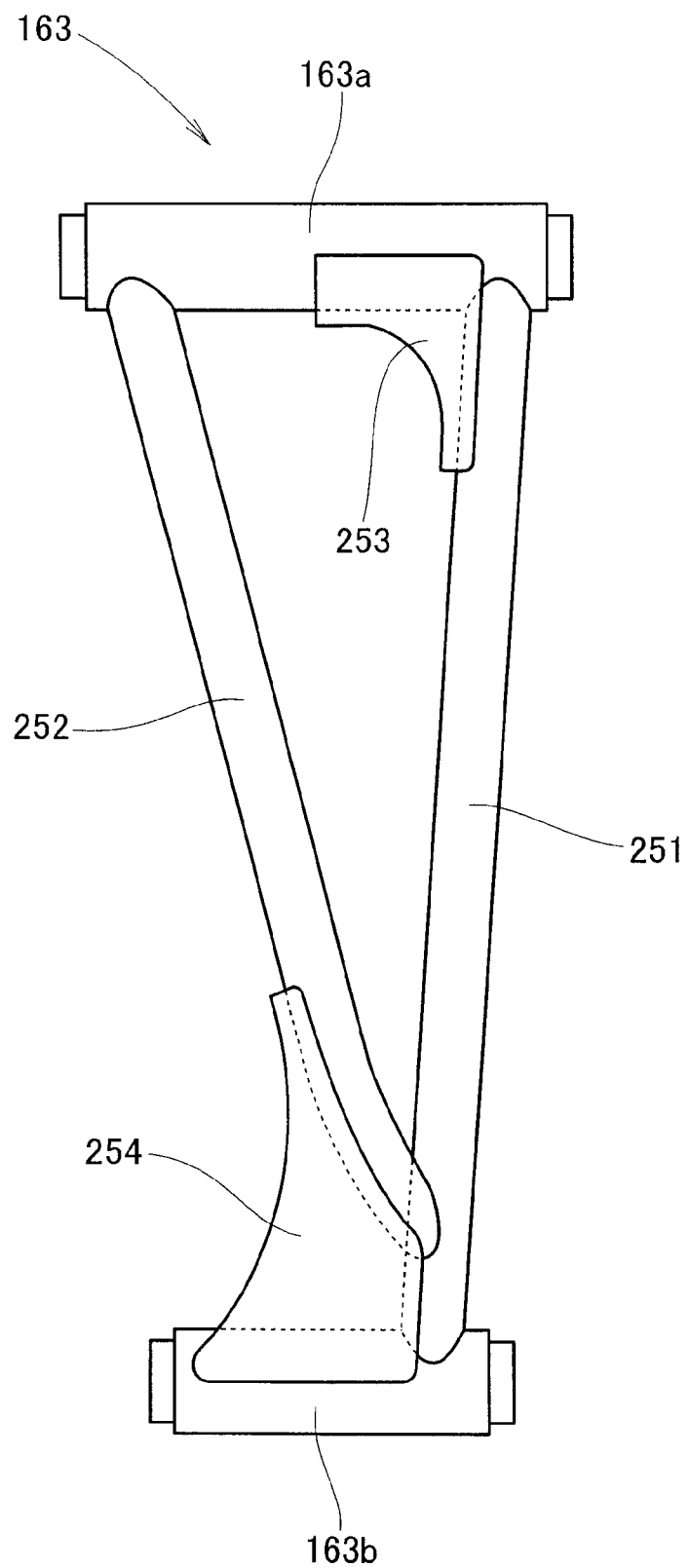
FIG. 6 is a plan view of an upper arm of the vehicle.

Referring to FIG. 6, the upper arm 163 includes the mounting portion 163a mounted to a side of the vehicle body frame 11 (see FIG. 1), an upper first arm 251 extending from the mounting portion 163a substantially at a right angle to the axis of the mounting portion 163a, a mounting portion 163b mounted to a distal end of the upper first arm 251 for connection to the knuckle arm 201 (see FIG. 4), an upper second arm 252 extending from the mounting portion 163a to a position located in the vicinity of the distal end of the upper first arm 251, a reinforcing member 253 mounted to the mounting portion 163a and the upper first arm 251, and a reinforcing member 254 mounted to the upper first arm 251, the mounting portion 163b, and the upper second arm 252. The right upper arm 164 and the left upper arm 163 are symmetrically disposed and have the same structure. Therefore, detailed description of the upper arm 164 is omitted.

Figure 7:
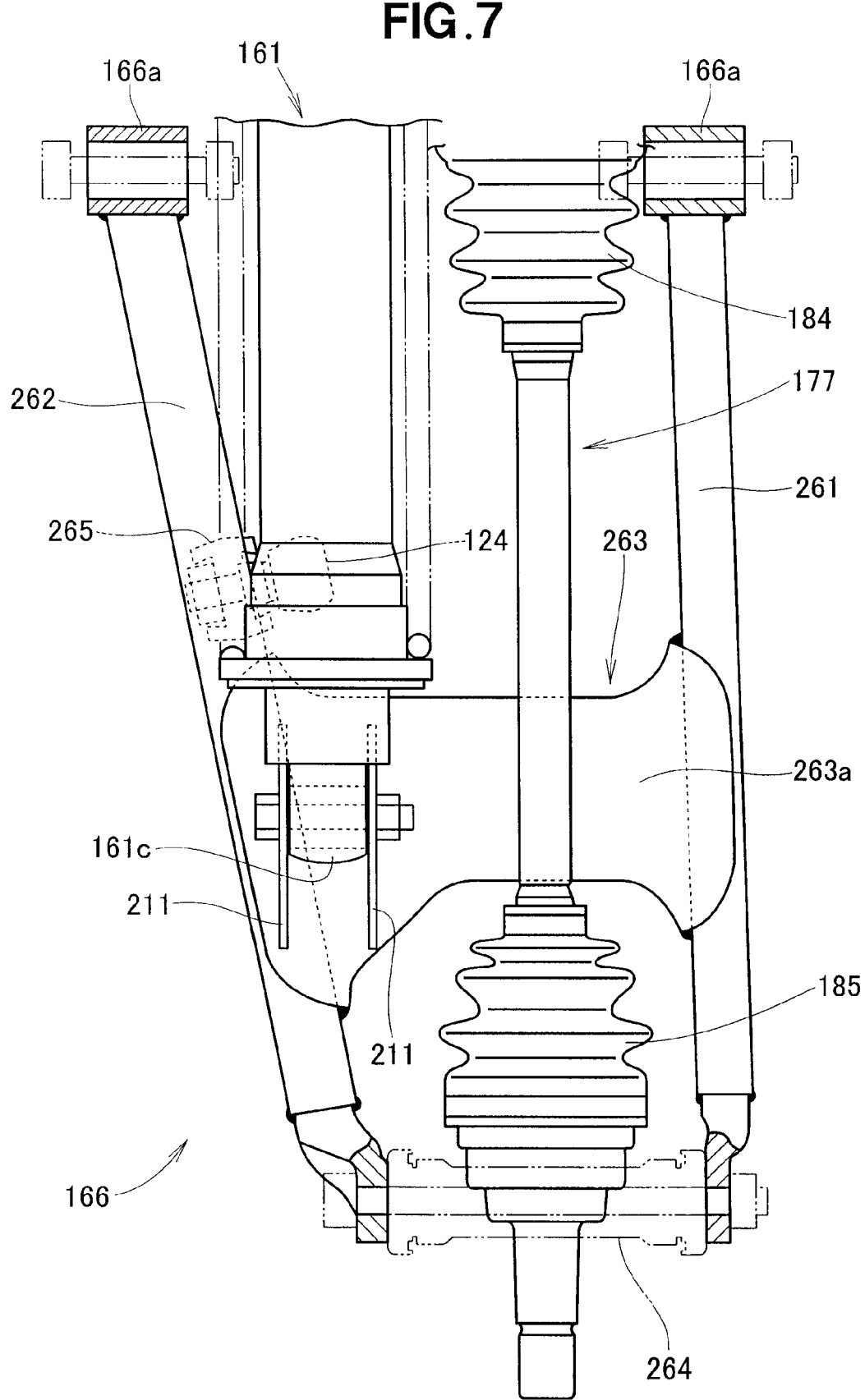
FIG. 7 is a plan view of a lower arm of the vehicle.

Referring to FIG. 7, the lower arm 166 includes the mounting portions 166a, 166a mounted to a side of the vehicle body frames 11 (see FIG. 1), a lower first arm 261 extending from one of the mounting portions 166a, 166a substantially at a right angle to the axis of the mounting portion 166a, a lower second arm 262 obliquely extending from the other mounting portion 166a towards the lower first arm 261 with a distal end of the arm 262 being disposed close to the lower first arm 261, a connecting member 263 extending between the lower first arm 261 and the lower second arm 262, and a mounting portion 264 extending between a distal end of the lower first arm 261 and a distal end of the lower second arm 262.

The connecting member 263 includes an upper surface 263a having a portion located in the vicinity of the lower second arm 262. To such a portion of the upper surface 263a, there is attached cushion mounting brackets 211, 211 disposed in parallel and extending in the width direction of the vehicle.

Reference numeral 265 designates a ball joint mounting member attached to a lower portion of the lower second arm 262 for connection to the ball joint 124 of the anti-roll bar device 54 (see FIG. 1).

Figure 8A:
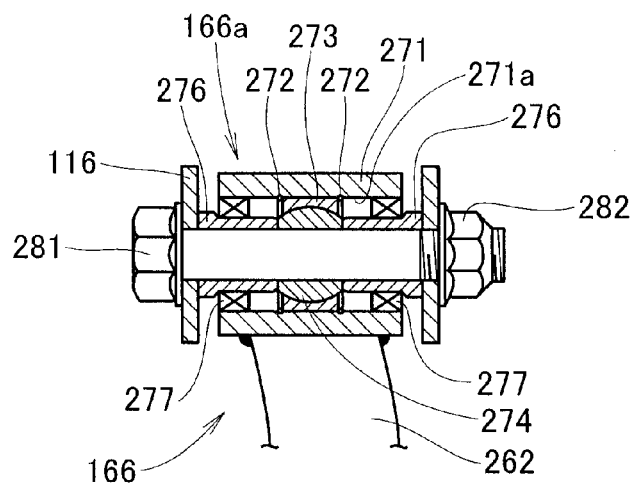
FIG. 8A is a cross-sectional view of one end of the lower arm for connection to a vehicle body of the vehicle.

FIG. 8A shows the mounting portion 166a of the lower arm 166 to be mounted to the side of the vehicle body frame 11 (see FIG. 1).

The mounting portion 166a includes a tubular member 271 attached to the end of the lower second arm 262, an outer ring 273 secured by retaining rings 272, 272 to an inner peripheral surface 271a of the tubular member 271, an inner ring 274 having a convex surface sidably fitted with a concave surface of the outer ring 273, collars 276, 276 abutting against opposite ends of the inner ring 274, and sealing members 277, 277 each interposed between the collar 276 and the tubular member 271. A mounting bolt 281 is inserted through the lower arm supporting portion 116, the collar 276, the inner ring 274, the collar 276 and the lower arm supporting portion 116 in order, and a nut 282 threadedly engages the distal end of the mounting bolt 281 for attaching the lower arm 166 to the lower arm supporting portion 116.

Figure 8B:
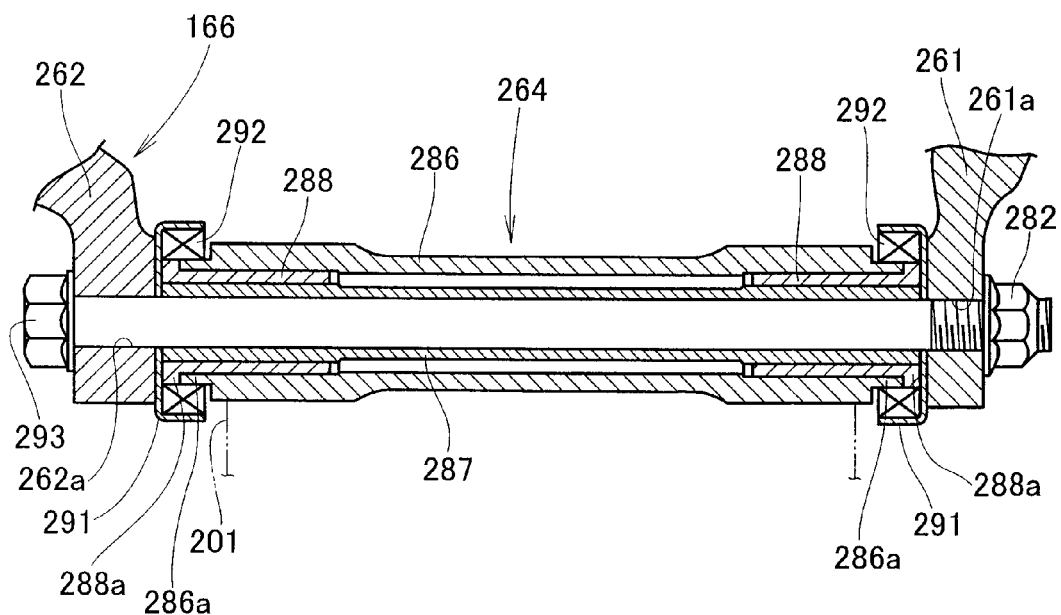
FIG. 8B is cross-sectional view of the opposite end of the lower arm for connection to a knuckle arm.

FIG. 8B shows mounting portion 264 of the lower arm 166 to be mounted to the knuckle arm 201 (FIG. 4).

The mounting members 264 include an outer tubular member 286 mounted to the knuckle arm 201, an inner tubular member 287 disposed inside the outer tubular member 286, bushes 288, 288 each interposed between one end of the outer tubular member 286 and one end of the inner tubular member 287, substantially cup-shaped end seat members 291, 291 each abutted against an end surface of the inner tubular member 287 and an end surface of the bush 288, and sealing members 292 disposed in sealing engagement with small-diameter portions 286a of the outer tubular member 286, flanges 288a of the bushes 288, and the inner peripheral surfaces of the end seat members 291 to establish a sealing engagement with ends of the mounting portion 264.

A mounting bolt 293 is inserted through a through hole 262a formed through the lower second arm 262, the end seat member 291, the inner cylindrical member 287, the end seat member 291, and a through hole 261a formed through the lower first arm 261 in sequence, and a nut 282 threadedly engages a distal end of the mounting bolt 293 for attaching the knuckle arm 201 to the lower first arm 261 and the lower second arm 262.

Figure 9:
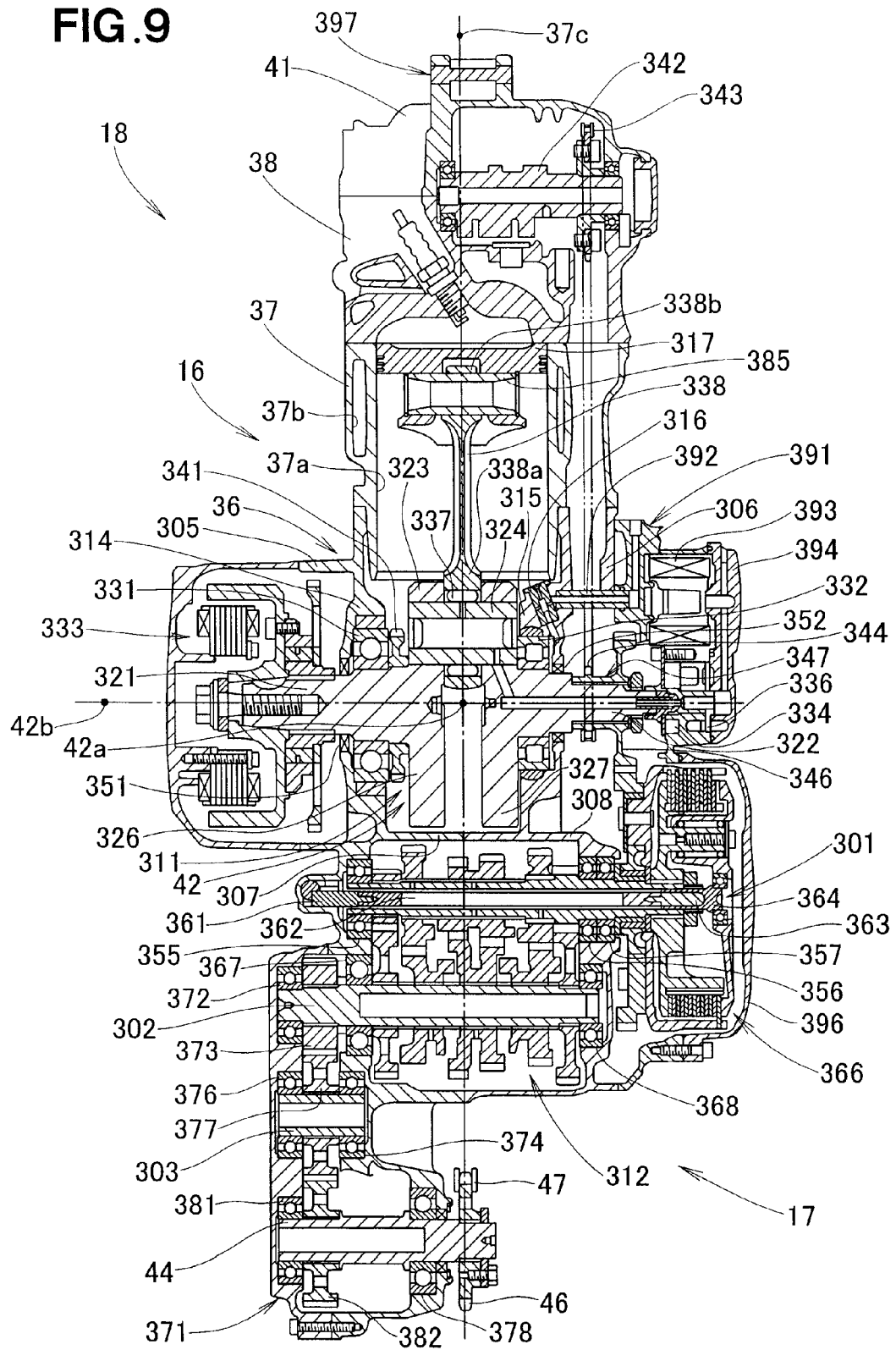
FIG. 9 is a cross-sectional view of a power unit of the vehicle.

FIG. 9 is a cross-sectional view of the power unit of the vehicle according to the present invention. The engine 16 provided in a front part of the power unit 17 includes the crankcase 36, the cylinder block 37, the cylinder head 38, and the head cover 41. The crankshaft 42, a main shaft 301, a counter shaft 302, an intermediate shaft 303 and the output shaft 44 are rotatably accommodated within the crankcase 36. The main shaft 301, the counter shaft 302, the intermediate shaft 303 and the output shaft 44 are disposed rearward of the crankshaft 42 and disposed on a side of the transmission 17. The crankcase 36 includes a left crankcase half 305 and a right crankcase half 306 connected together. The left crankcase half 305 has a partition wall 307. The right crankcase half 306 has a partition wall 308. A closed crank chamber 311 and a transmission chamber 312 are separated by the partition walls 307, 308.

The left crankcase half 305 includes a first main bearing unit 314 on which the crankshaft 42 is mounted. The right crankcase 306 includes a second main bearing unit 315 on which the crankshaft 42 is mounted. An oil jet nozzle 316 for cooling a piston as described later is attached to the second main bearing unit 315. The oil jet nozzle 306 is disposed on a side of the cylinder block 37.

The cylinder block 37 is of a water-cooled system. The cylinder block 37 has a cylinder bore 37a within which a piston 317 is movably disposed. The cylinder block 37 has a water jacket 37b through which a cooling water flows. Reference numeral 37c designates a cylinder axis of the cylinder bore 37a.

The crankshaft 42 includes first and second shaft portions 321, 322, a crank portion 323 interconnecting the first and second shaft portions 321, 322, a crankpin 324 mounted to the crank portion 323, and counterweights 326, 327 provided on the first and second shaft portions 321, 322 and located on one side of a central axis of the 321, 322 opposite from the crank portion 323. A point 42a is a crankshaft center located on an axis 42b of the crankshaft 42. A distance between the crankshaft center 42a and the counterweight 326 provided in the first shaft portion 321 is equal to a distance between the crankshaft center 42a and the counterweight 327 provided in the second shaft portion 322. The crankshaft center 42a, the drive sprocket 46 and the aforementioned driven sprocket 134 (see FIG. 3) are disposed on approximately the same line.

The crankshaft 42 is rotatably mounted to the left crankcase half 305 via a radial ball bearing 331 and is rotatably mounted to the right crankcase half 306 via a radial roll bearing 332. The crankshaft 42 has, at one end thereof, an AC generator 333 for generating electricity. The crankshaft 42 has, at the opposite end thereof, a first oil pump 334 and a second oil pump 336 for performing dry sump lubrication. A connecting rod 338 has a big end 338a rotatably mounted to the crankpin 324 via a bearing 337. A balancer shaft drive gear 341 for driving a balancer shaft (not shown) is fitted to the first shaft portion 321. A gear member 347 including a cam shaft drive gear 344 for driving a cam shaft 342 via a chain 343 and a main shaft drive gear 346 for driving the main shaft 301 located on the side of the transmission 17 is mounted to the second shaft portion 322. Reference numerals 351, 352 designate oil seals for preventing leakage of oil from the crank chamber 311.

The main shaft 301 is rotatably mounted to the left crankcase 305 via a baring 355 and rotatably mounted to the right crankcase 306 via bearings 356, 357. The main shaft 301 accommodates therein a first rod 361, a second rod 362, a third rod 363, and a fourth rod 364 all of which are axially movable. The main shaft 301 includes one end having an outer periphery spline-connected to a crutch 366. A plurality of drive gears are axially movably spline-connected to the outer periphery of the main shaft 301.

By undergoing axial movement, the first rod 361, the second rod 362, the third rod 363, and the fourth rod 364 engage or disengage the clutch 366 for controlling transmission of a drive power from the crankshaft 42 to the main shaft 301.

The countershaft 302 is rotatably attached to the left crankcase half 305 via a bearing 367, to the right crankcase half 306 via a bearing 368, and to a left case cover 371 via a bearing 372. A plurality of driven gears engaging the drive gears of the main shaft 301 are axially movably spline-connected to an outer periphery of the countershaft 302. A first gear 373 is attached to the end of the countershaft 302.

The intermediate shaft 303 is rotatably mounted to the left crankcase half 305 via a bearing 374 and to the left case cover 371 via a bearing 376. A second gear 377 engaging the first gear 373 is mounted to the intermediate shaft 303.

The output shaft 44 is rotatably mounted to the left crankcase half 305 via a bearing 378 and to the left case cover 371 via a bearing 381. A third gear 382 engaging the second gear 377 is mounted to the output shaft 44. Attached to one end of the output shaft 44 is the drive sprocket 46 for driving the rear wheels 21, 22 (see FIG. 1) via the chain 47.

The piston 317 is rotatably mounted to a small end 338b of the connecting rod 338 via a piston pin 385.

A case side cover 391 is mounted to the side of the right crankcase half 306. A connecting pipe 392 interconnects the case side cover 391 and the second main bearing unit 315 of the right crankcase 306. Reference numeral 393 designates an oil filter and reference numeral 394 designates an oil filter cover. A cover 396 covers the outside of the clutch 366. A mounting member 397 mounts the engine 16 to the vehicle body frame.

Figure 10:
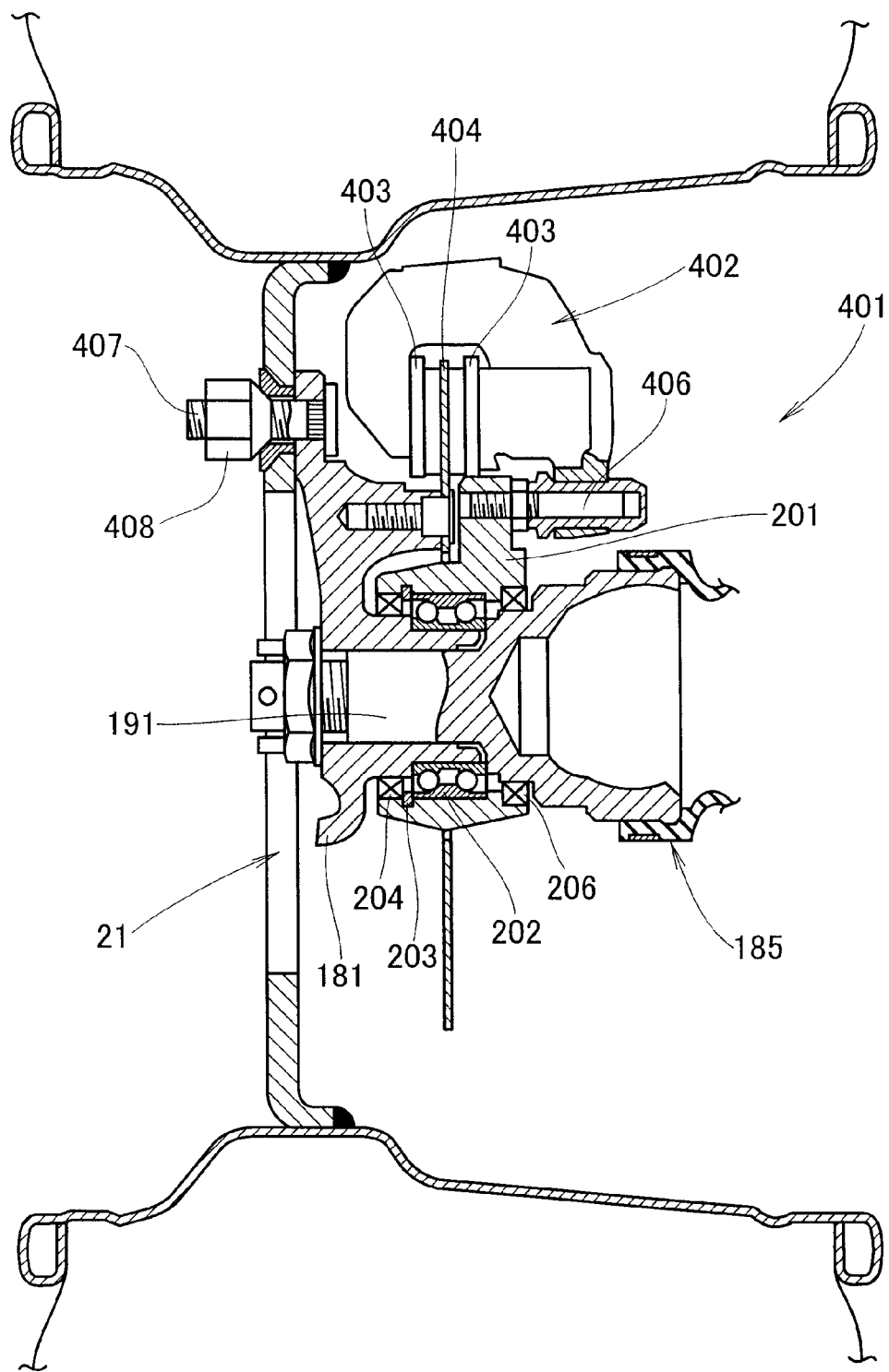
FIG. 10 is a cross-sectional view of a disk brake device of the vehicle.

Reference is made to FIG. 10. A disk brake device 401 includes a brake caliper 402 mounted to the knuckle arm 201, and a brake disk 404 to be sandwiched between two brake pads 403, 403 by operation of a piston (not shown), movably accommodated in the brake caliper 402, under a hydraulic pressure.

The brake caliper 402 is mounted to the knuckle arm 201 by a bolt 406 being screwed into the knuckle arm 201 in such a manner that the brake caliper 402 can move in a direction orthogonal to the sliding surface of the brake disk 404. The brake disk 404 is mounted to the hub 181. The rear wheel 21 is mounted to the hub 181 by a mounting bolt 407 secured to the hub 181. A tapered wheel nut 408 threadedly engages the mounting bolt 407.

Discussion will be made as to operation of attachment and detachment of the driven sprocket 134 with reference to FIG. 11 to FIG. 13.

Figure 11:
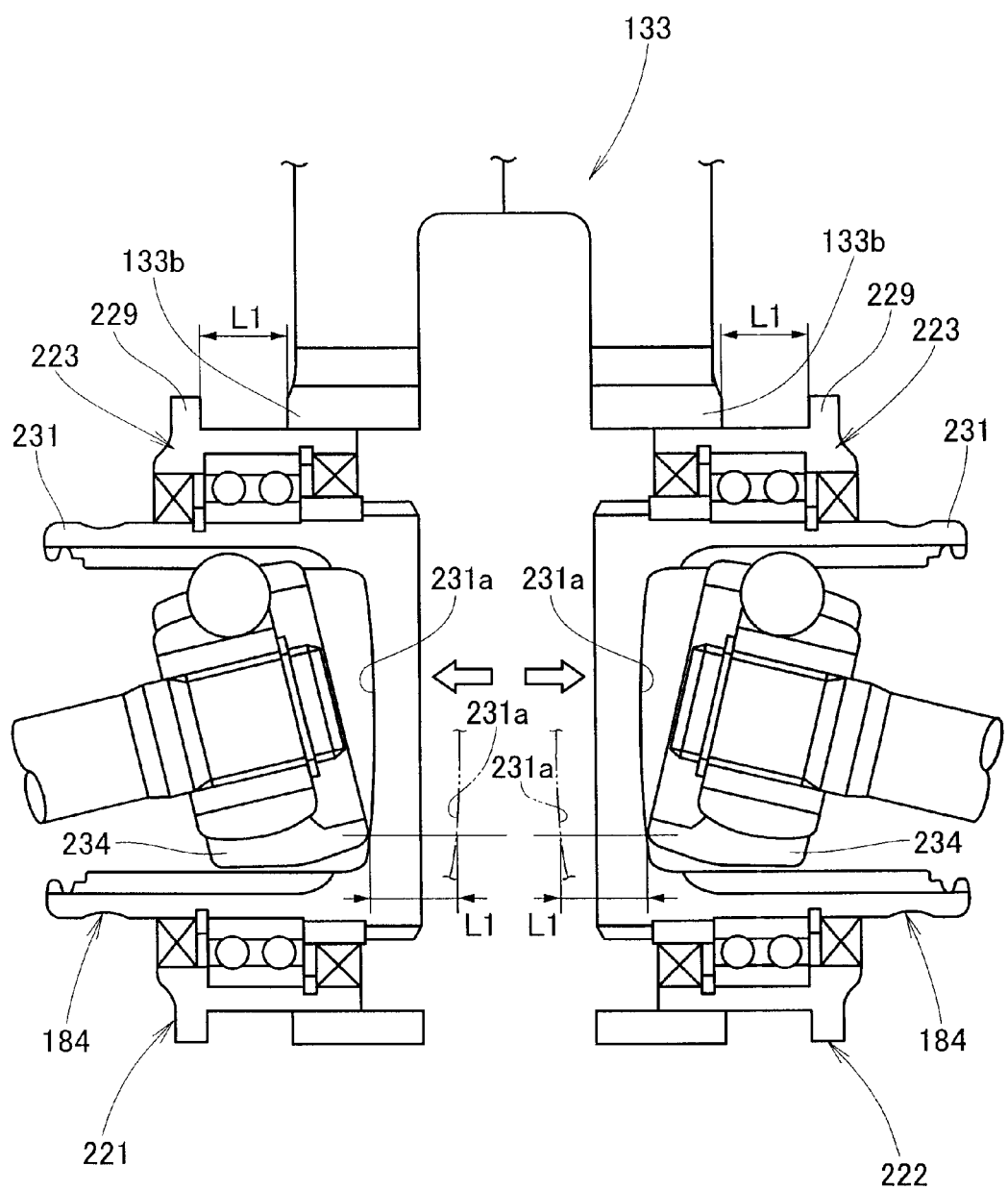
FIG. 11 is a view showing right and left constant velocity joints moving away from each other to provide a space therebetween for disposition of a driven sprocket.

Referring to FIG. 11, the left housing 231 and the left tubular member 223 are moved together relative to the final gearcase 133 in a direction shown by a profiled arrow. Simultaneously, the right housing 231 and the right tubular member 223 are moved together relative to the final gearcase 133 in a direction shown by a profiled arrow.

When the housing 231 is moved by an amount or distance L1 to thereby bring the bottom surface 231a of the housing 231 into abutment against one part, that is, the cage 234 of the constant velocity joint 184, the flange 229 of the tubular member 223 is spaced from the side surface 133b of the final gearcase 133 by the same distance L1.

Figure 12:
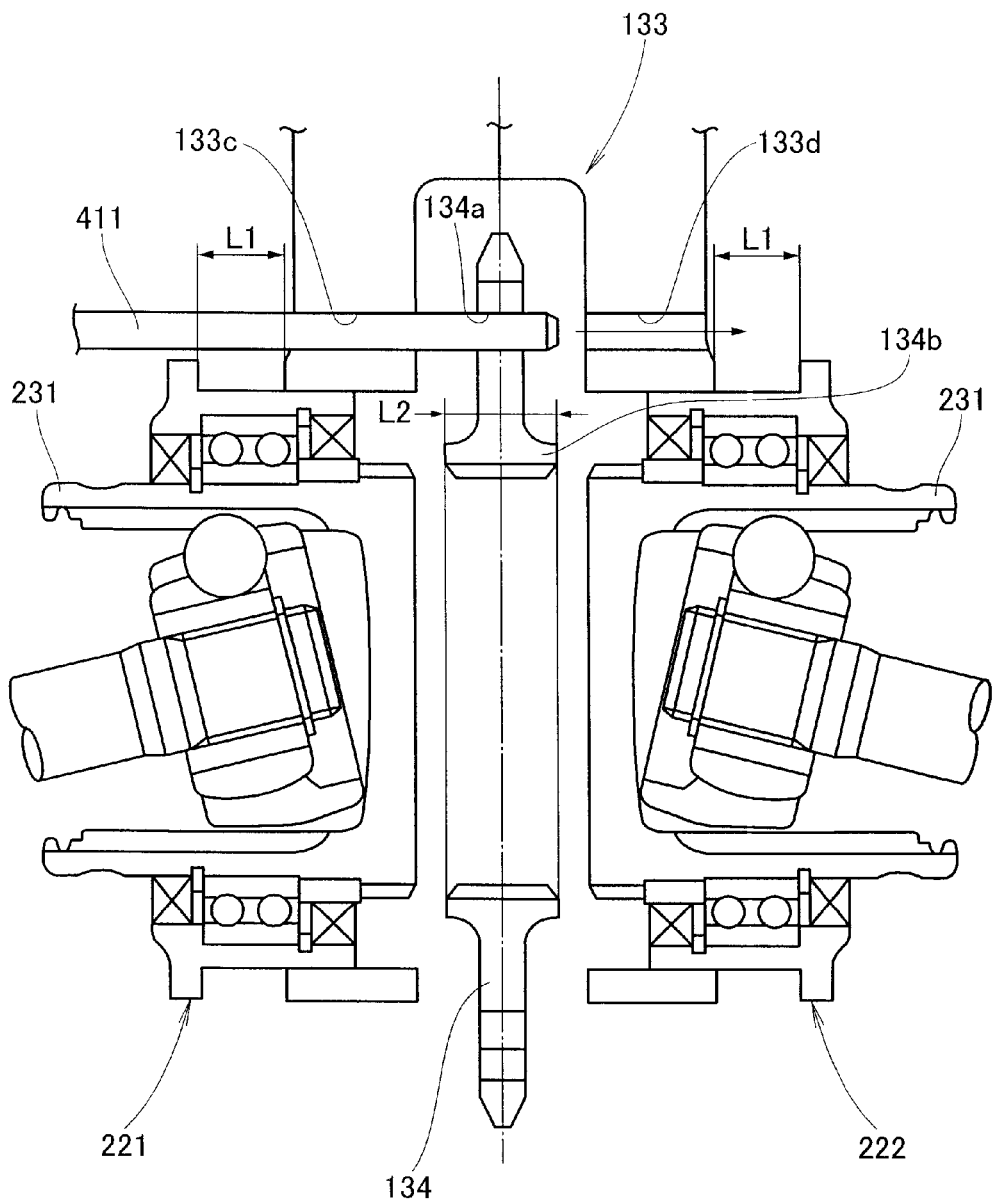
FIG. 12 is a view showing the driven sprocket retained by a sprocket retaining tool.

Turning to FIG. 12, the driven sprocket 134 is disposed in a space between the left and right housings 231, 231. Then, a sprocket retaining tool 411 is inserted into a tool insertion holes 133c formed in the final gearcase 133, through a tool insertion elongated hole 134a formed in the driven sprocket 134, and further through a tool insertion holes 133d formed in the final gearcase 133 as shown by an arrow, so that the driven sprocket 134 is retained in the final gearcase 133. The driven sprocket 134 has a proximal portion 134b having a width L2 set to be provide the following relation with the distance L1: L1>(0.5×L2).

Figure 13:
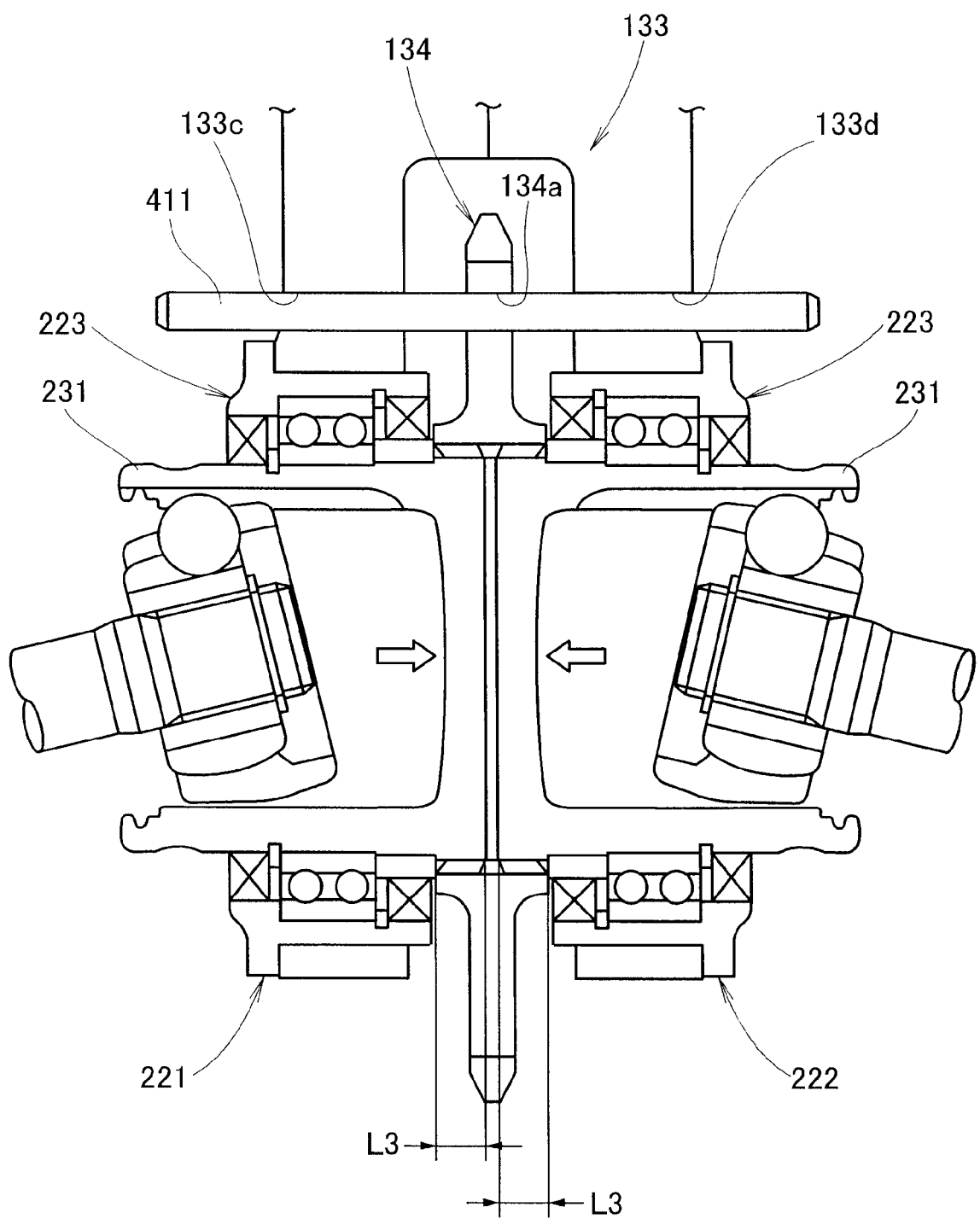
FIG. 13 is a view showing the right and left constant velocity joints moving towards each other into meshing engagement with the driven sprocket.

Turning to FIG. 13, the left and right housings 231 and the left and right tubular members 223, 223 are moved to the center of the final gearcase 133 as shown by profiled arrows. The left and right tubular members 223, 223 are then mounted to the final gearcase 133 by mounting bolts. Next, the sprocket retaining tool 411 is pulled out from the tool insertion holes 133c, 133d of the final gearcase 133 and the tool insertion elongated hole 134a of the driven sprocket 134. Operation for assembling the driven sprocket 134 and the housings 231, 231 together is therefore completed.

The driven sprocket 134 has engaging areas engaging or spline-connected to the housings 231, 231. Each engaging area of the driven sprocket 134 has a length L3 set to be smaller than the distance L1 (L1>L3).

For removal of the driven sprocket 134 from the housings 231, 231, the mounting bolts are loosened to remove the tubular members 223, 223 from the final gearcase 133 and then the left and right housings 231, 231 are moved sideways.

According to the present invention, as described in relation to FIG. 1, FIG. 4, and FIG. 5, there is provided a drive power transmitting system for the rough-terrain traveling vehicle 10. The structure includes one pair of drive shafts 177, 178 and left and right constant velocity joints 184, 184 each connected to one end of the drive shaft. The drive shafts 177, 178 transmit a drive power from the power unit 18 serving as a drive power source to the rear wheels 21, 21 suspended independently. The left and right constant velocity joints 184, 184 are supported by the final gearcase 133 provided to the vehicle body and are individually attachable to and detachable from the vehicle body.

Because the left and right constant velocity joints 184, 184 are supported by the final gearcase 133 and individually attachable to and detachable from the vehicle body, the constant velocity joints 184, 184 can be disposed close to each other. Thus, the drive shafts 177, 178 can be lengthened to allow the suspension to operate over a large stroke. With this arrangement, the vehicle 10 can travel more satisfactorily. Moreover, the left and right constant velocity joints 184, 184 can be individually assembled to the final gearcase 133. Thus, the constant velocity joints 184, 184 can be assembled to the final gearcase 133 with improved efficiency. Further, the left and right constant velocity joints 184, 184 can be separately attached to and detached from the vehicle body for undergoing improved maintenance operation.

In a preferred form of the present invention, the left and right bearing units 221, 222 of the bearing unit 176 serving as connecting units are provided on the constant velocity joints 184, 184 and connect the constant velocity joints 184, 184 to the final gearcase 133. The left and right constant velocity joints 184, 184 are capable of individually being connected to and disconnected from the final gearcase 133.

Since the constant velocity joints 184, 184 are connected to the final gearcase 133 by the bearing units 221, 222 and can be individually connected to and disconnected from the final gearcase 133, the left and right constant velocity joints 184, 184 can be disposed closely to each other. With this arrangement, the drive shafts 177, 178 can be lengthened to allow the suspension to operate over a large stroke. As a result, the rough-terrain traveling vehicle 10 can travel more satisfactorily. Further, the left and right bearing units 221, 222 can be individually assembled to the final gearcase 133. Furthermore, the left and right bearing units 221, 222 can be individually attached to and detached from the final gearcase 133 for the purpose of maintenance operation.

In a further preferred form of the present invention, the driven sprocket 134 to which the drive power from the power unit 18 is transmitted has one side provided on the left constant velocity joint 184 and the opposite side provided on the right constant velocity joint 184. The left and right constant velocity joints 184, 184 provide improved support for the driven sprocket 134 to which the drive power is applied. Thus, the drive power is reliably transmitted to the driven sprocket 134.

In a further preferred form of the present invention, each of the bearing units 221, 222 includes the tubular member 223 detachably supported by the final gearcase 133, the bearing 226 attached to an inside of the tubular member 223 for rotatably supporting the housing 231 of the constant velocity joint 184, and the sealing members 227, 228 disposed on both sides of the bearing 226 for providing a seal between the tubular member 223 and the housing 231.

Each of the bearing units 221, 222 can be assembled prior to attachment to the final gearcase 133. Such a previously assembled bearing unit can be easily attached to and detached from the final gearcase 133. Thus, the bearing units 221, 222 can be assembled to the final gearcase 133 with improved efficiency. Moreover, because the sealing members 227, 228 cover both sides of the bearing 226, the sealing members 227, 228 prevent the bearing 226 from being exposed to mud or dust.

In a further preferred form of the present invention, the left and right housings 231, 231 are disposed closely to each other and have outer peripheral portions detachably connected to the driven sprocket 134 to which the drive power from the power unit 18 is transmitted.

Since the driven sprocket 134 is detachably connected to the outer peripheral portions of the left and right housings 231, 231, the driven sprocket 134 can be easily attached to and detached from the left and right housings 231, 231. Accordingly, the driven sprocket 134 can undergo maintenance operation with improved efficiency.

Additionally, the left and right housings 231, 231 support the driven sprocket 134. Thus, there is no need for an additional particular member for supporting the driven sprocket 134. Therefore, the number of components for the drive power transmitting system can be reduced. The driven sprocket 134 can be disposed in the vicinity of a boundary between the left housing 231 and the right housing 231. Thus, the left and right housings 231, 231 can bear approximately the same burden of supporting the driven sprocket 134.

In a further preferred form of the present invention, as discussed in relation to FIG. 11 and FIG. 13, the housings 231, 231 of the constant velocity joints 184, 184 are cup-shaped members having the outer peripheral portions detachably connected to the driven sprocket 134. The cup-shaped housing has a bottom having the bottom surface 231a. The constant velocity joint 184 has one part or the cage 234 pivotably connected to the inside of the housing 231 and being sidable in an axial direction of the housing 231. The driven sprocket 134 has engaging areas each provided for engaging one of the housings 231, 231. A distance between the bottom surface 231a of the cup-shaped housing 231 and the cage 234 is larger than a length L3 of each engaging area of the driven sprocket 134.

By moving towards the one part or the cage 234 held stationary, each of the left and right housings 231, 231 is detached from the driven sprocket 134. Thus, the driven sprocket 134 can be easily attached to and detached from the housings 231, 231 for undergoing maintenance operation with improved efficiency.

In a further preferred form of the present invention, as discussed in relation to FIG. 5 and FIG. 9, the driven sprocket 134 is provided centrally in a vehicle width direction of the vehicle. The driven sprocket 134 and a crankshaft center 42a of the crankshaft 42 disposed in the power unit 18 provided on the vehicle body are disposed on approximately the same line.

With this arrangement, weights of left and right parts of the vehicle body can be satisfactorily balanced with each other.

In a further preferred form of the present invention, as discussed in relation to FIG. 12, the driven sprocket 134 has an engagement portion or tool insertion elongated hole 134a engageable with the sprocket retaining tool 411 from a lateral side of the driven sprocket 134 to retain the driven sprocket 134 in the final gearcase 133 when the driven sprocket 134 is assembled to the housings 231, 231.

Thus, when the driven sprocket 134 is assembled to the housings 231, 231, the sprocket retaining tool 411 can be brought from the lateral side of the driven sprocket 134 into engagement with the tool insertion elongated hole 134a of the driven sprocket 134. Accordingly, the driven sprocket 134 can be easily assembled to the housings 231, 231.

In a further preferred form of the present invention, the engagement portion of the driven sprocket 134 has the plural tool insertion elongated holes 134a formed therein. The driven sprocket 134 is retained in the final gearcase 133 by insertion of the sprocket retaining tool 411 through the holes 134a and through a plurality of the tool insertion holes 133c, 133d formed in the final gearcase 133.

Since the plural tool insertion elongated holes 134a are formed in the driven sprocket 134 and the plural tool insertion holes 133c, 133d are formed in the final gearcase 133, the holes through which the sprocket retaining tool 411 is to be inserted can be selected from the plural holes 134a, 133c, 133d. Therefore, the tool 411 can be easily inserted through the holes.

In a preferred form of the present invention, as discussed in relation to FIG. 2, FIG. 4 and FIG. 5, the final gearcase 133 has a lower portion supported by a pair of left and right under frames or the lower frames 76, 76 provided on the vehicle body. The driven sprocket 134 to which the drive power from the power unit 18 is transmitted is disposed in the vicinity of the lower frames 76, 76 and above a space defined between the lower frames 76, 76.

Because the final gearcase 133 is supported by the pair of the left and right lower frames 76, 76 and the driven sprocket 134 is disposed in the vicinity of the lower frames 76, 76, the final gearcase 133 to which the drive power is applied can be securely supported by the lower frames 76, 76. In addition, since the driven sprocket 134 is disposed in the vicinity of the lower frames 76, 76, the driven sprocket 134 can be securely supported by the lower frames 76, 76 even if the driven sprocket 134 undergoes a great drive power.

In a further preferred form of the present invention, the drive shafts 177, 178 are connected to the pair of left and right rear wheels 21, 21. The vehicle 10 is used for traveling on a rough terrain. The independent suspension is a double wishbone independent suspension provided in the vehicle 10 and including upper arms 163, 164 and lower arms 166, 167.

Thus, the suspension can be set more freely in the vehicle. With the suspension thus provided in the vehicle 10, the rough-terrain traveling vehicle 10 can be driven with increased comfortableness.

Figure 14:
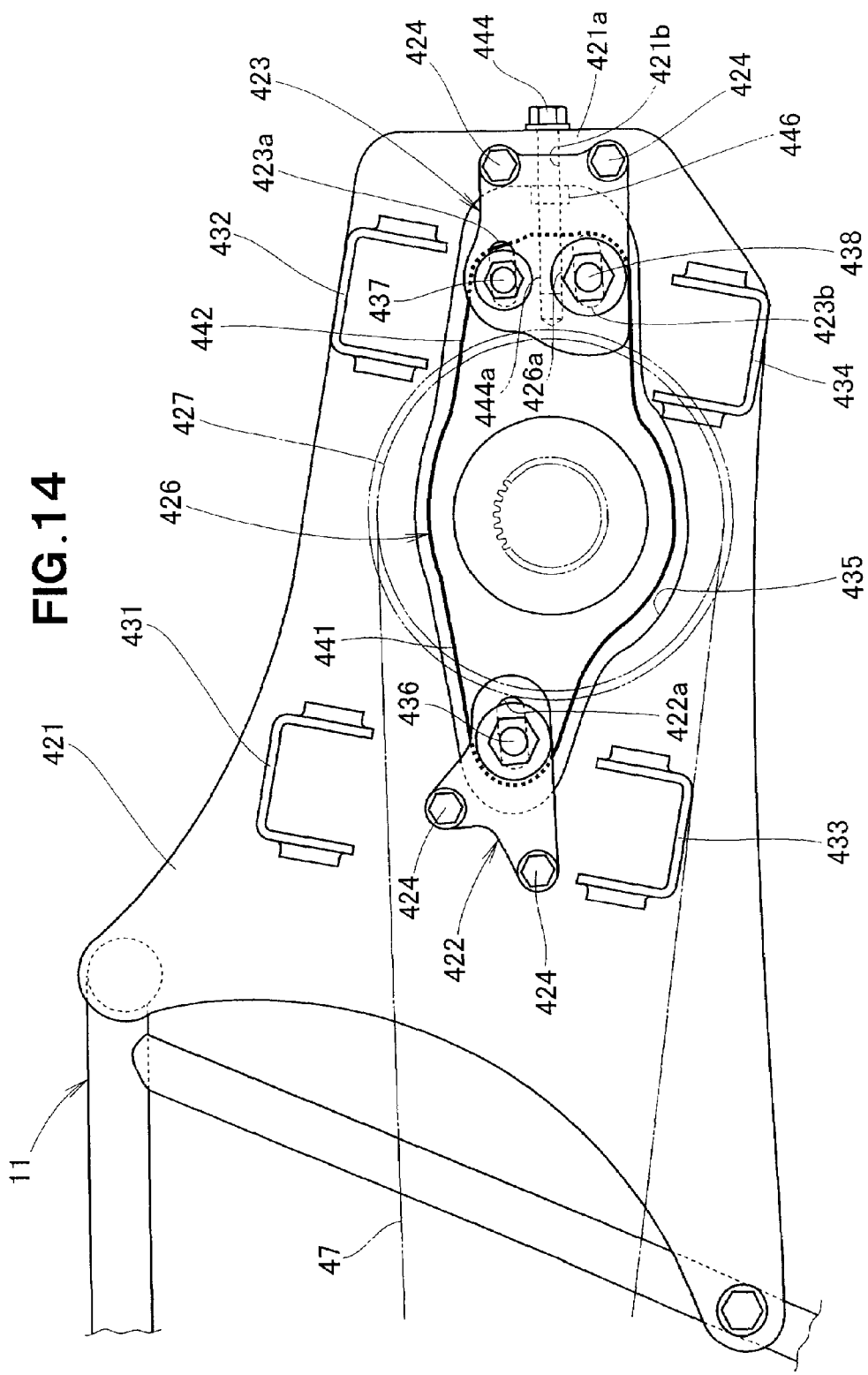
FIG. 14 is a side elevation view of a drive power transmitting unit according to a second embodiment of the present invention.

Referring to FIG. 14, there is shown a drive power transmitting unit according to a second embodiment of the present invention. The vehicle body frame 11 has a rear part to which a pair of left and right rear frame members 421, 421 (only one shown) are attached. Front case supporting plates 422, 422 (only one shown) are attached by bolts 424, 424 to the left and right rear frame members 421, respectively. Likewise, rear case supporting plates 423, 423 (only one shown) are attached by bolts 424, 424 to the left and right rear frame members 421, 421, respectively. The front case supporting plates 422, 422 and the rear case supporting plates 423, 423 support a final gearcase 426 (having an outline shown by a bold line). In the final gearcase 426, a driven sprocket 427 to which a drive power from the power unit 18 (FIG. 1) is transmitted through the chain 47 is rotatably supported. The same components in the second embodiment of the present invention as those in the first embodiment are designated by the same reference numerals and their description will be omitted.

Attached to the rear frame member 421 are upper arm supporting members 431, 432 by which an upper arm (not shown) supporting the rear wheel 21 is vertically swingably supported. Similarly, attached to the rear frame member 421 are lower arm supporting members 433, 434 by which a lower arm (not shown) supporting the rear wheel 21 is vertically swingably supported. The rear frame members 421, 421 have holes 435, 435 (only one shown) formed therein. The holes 435, 435 have their outline extending along an outline of the final gearcase 426, as viewed in side elevation, and have a larger size than the final gearcase 426 for allowing disposition of the final gearcase 426 in the holes 435, 435.

The front case supporting plates 422, 422 have elongated holes 422a, 422a (only one shown in FIG. 14) extending in a front-and-rear direction. A through bolt 436 passes through the elongated holes 422a, 422a and a nut 455 (FIG. 15) is tightened onto the bolt 436 to attach a front part (front arm portion 441) of the final gearcase 426 to the front case supporting plates 422, 422.

The rear case supporting plates 423, 423 each have elongated holes 423a, 423b extending in the front-and-rear direction. A through bolt 437 passes through the elongated holes 423a, 423a. A through bolt 438 passes through the elongated holes 423b, 423b. Nuts 455, 455 (only one shown in FIG. 15) are tightened onto the bolts 437, 438. With this arrangement, a rear part (rear arm portion 442) of the final gearcase 426 is attached to the rear case supporting plates 423, 423.

The final gearcase 426 has the front arm portion 441 attached to the front case supporting plates 422, 422, and the rear arm portion 442 attached to the rear case supporting plates 423, 423.

For adjusting a play of the chain 47, the final gearcase 426 is moved back and forth relative to the front case supporting plates 422, 422 and the rear case supporting plates 423, 423. With the play of the chain 47 adjusted, an adjusting bolt 444 is screwed through a through hole 421b formed in a rear end 421a of the rear frame member 421 to bring a tip end portion 444a of the bolt 444 into threaded engagement with an internal thread 426 formed in the rear arm portion 442 of the final gearcase 426. The adjusting bolt 444 is prevented by a lock nut 446 from rotating.

Figure 15:
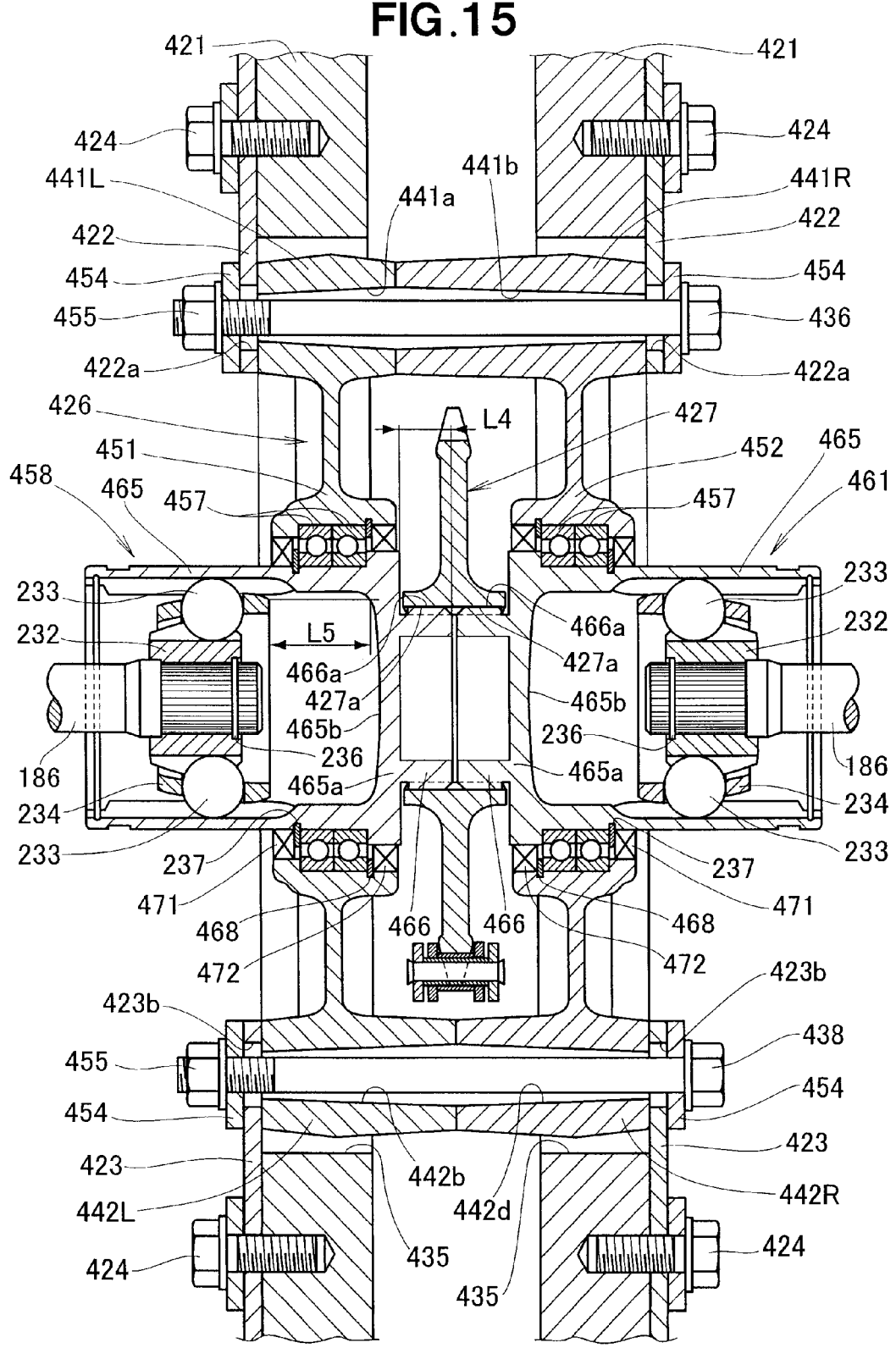
FIG. 15 is a cross-sectional view of the drive power transmitting unit shown in FIG. 14.

Referring to FIG. 15, the final gearcase 426 includes a left case member 451 and a right case member 452. The left case member 451 has a front arm portion 441L having a front side bolt insertion hole 441a formed therethrough. The left case member 451 has a rear arm portion 442L having rear side bolt insertion holes 442a, 442a (only one shown) formed therethrough. The right case member 452 has a front arm portion 441R having a front side bolt insertion hole 441b formed therethrough. The right case member 452 has a rear arm portion 442R having rear side bolt insertion holes 442b, 442b (only one shown) formed therethrough. The front case supporting plates 422, 422 are attached to the left and right rear frame members 421, 421 by the bolts 424, 424. The rear case supporting plates 423, 423 are attached to the left and right rear frame members 421, 421 by the bolts 424. The through bolt 436 passes through a washer 454, the elongated hole 422a, the front side bolt insertion holes 441a, 441b, the elongated hole 422a and a washer 454, and the nut 455 is screwed onto a tip end portion of the through bolt 436. The through bolt 437 (FIG. 14) passes through a washer (not shown), the elongated hole 423a (FIG. 14), the rear side bolt insertion holes (not shown), the elongated hole 423a (FIG. 14) and a washer (not shown), and the nut (not shown) is screwed onto a tip end portion of the bolt 437. The through bolt 438 passes through a washer 454, the elongated hole 423b, the rear side bolt insertion holes 442a, 442b, the elongated hole 423b and a washer 454, and the nut 454 is screwed onto a tip end portion of the through bolt 438. With this arrangement, the left case member 451 and the right case member 452 are mated together, and the final gearcase 426 having the left and right case members 451, 452 thus mated together is attached to the left and right rear frame members 421, 421.

A constant velocity joint 458 is rotatably attached to the left case member 451 via bearings 457, 457. A constant velocity joint 461 is rotatably attached to the right case member 452 via bearings 457, 457. The constant velocity joints 458, 461 have the same structure and thus only the constant velocity joint 458 will be explained below.

The constant velocity joint 458 includes a housing 465 serving as an outer ring, an inner ring 232, a plurality of balls 233 movably disposed both in a plurality of ball grooves provided on an inner peripheral surface of the housing 465 and in a plurality of ball grooves provided on an outer peripheral surface of the inner ring 232, and a cage 234.

The housing 465 has an outer peripheral surface fitted with the bearings 457, 457 and undergoes a restricted axial movement under the action of a retaining ring 237. The housing 465 has a cup-shaped bottom portion 465a and an extending portion 466 integral with the bottom portion 465a and extending from the bottom portion 465a. The extending portion 466 has male splines 466a formed on an outer peripheral surface thereof.

The left and right extending portions 466, 466 of the housings 465, 465 of the constant velocity joints 458, 461 support the driven sprocket 427. The male splines 466a, 466a of the extending portions 466, 466 are spline-connected to female splines 427a formed on the driven sprocket 427. The housing 465 has a bottom surface 465b. A retaining ring 468 abuts on one end of the bearing 457 and restricts an axial movement of the housing 465. Sealing members 471, 472 are sealed to both sides of a set of the bearings 457, 457.

The extending portion 466 has an axial length L4. When the through bolts 436, 437, 438 (the bolt 437 is shown in FIG.

14) and the plural bolts 424 are removed and then one of the left and right case members 451, 452 is moved sideways of the vehicle body relative to the other case member, the housing 465 is moved by an amount or distance L5 into abutment with one part or cage 234 of the constant velocity joint 458 (or 461). The length L4 of the extending portion 466 is smaller than the distance L5 (that is, L4<L5). Therefore, for example, when the through bolts 436, 437, 438 and the bolts 424 are removed and then each of the left and right case members 451, 452 is slid sideways by the distance L5, the left and right extending portions 466, 466 of the housings 465, 465 of the constant velocity joints 458, 461 connected to the left and right case members 451, 452 are removed from the driven sprocket 427.

In a further preferred form of the present invention, as discussed in relation to FIG. 14 and FIG. 15, the final gearcase 426 includes the left case member 451 for connecting the left constant velocity joint 458 to the rear frame member 421, and the right case member 452 for connecting the right constant velocity joint 461 to the rear frame member 421, the left and right constant velocity joints 458, 461 are capable of being individually connected to and disconnected from the rear frame members 421, 421.

Since the left and right case members 451, 452 support the left and right constant velocity joints 458, 461, respectively, the left and right case members 451, 452 can bear reduced burdens of supporting the constant velocity joints 458, 461 and hence have reduced size and weight. Thus, the final gearcase 426 can be reduced in weight. Further, the left and right constant velocity joints 458, 461 can be individually assembled to the vehicle body. Furthermore, the left and right constant velocity joints 458, 461 can be individually attached to and detached from the vehicle body for undergoing maintenance operation.

In a further preferred form of the present invention, the left and right housings 465, 465 have the extending portions 466, 466 each provided at one end of the housing 465. The extending portions 466, 466 support the driven sprocket 427.

With this arrangement, the extending portion 466 can be smaller in outer diameter than other portions of the housing 465. Thus, the housing 465 can provide a small portion for connection to the driven sprocket 427. Moreover, the driven sprocket 427 can be located in the vicinity of a boundary between the left and right housings 465, 465. The left and right housings 465, 465 can have approximately the same burden of supporting the driven sprocket 427.

In a further preferred form of the present invention, the left and right housings 465, 465 are leftward and rightward slidable relative to the left and right case members 451, 452, respectively. The extending portion 466 has the length L4 smaller than the moving distance L5 of the housing 465.

When the left housing 465 is moved towards the one part or cage 234 of the constant velocity joint 458 while the right housing 465 is moved towards the one part or cage 234 of the right constant velocity joint 461, the extending portions 466, 466 can be disengaged or detached from the driven sprocket 427. Otherwise, when the left and right housings 465, 465 are moved away from the cages 234, the extending portions 466 can be easily attached to the driven sprocket 427.

Although the connecting unit includes the tubular member, the bearing and the sealing members in the illustrated embodiment, the connecting unit may include only the bearing so long as the bearing is supported by the case. Moreover, the left and right housings of the constant velocity joints may be rotatably connected to the case through no connecting unit, such that the left and right housings can be individually connected to and disconnected from the case.

INDUSTRIAL APPLICABILITY

A drive power transmitting system of this invention is suitable for use in a vehicle having independently suspended rear wheels in that it enables individual connection and disconnection of constant velocity joints with respect to a vehicle body.

The invention claimed is:

1. A drive power transmitting system for a vehicle, comprising:
   a pair of drive shafts for transmitting drive power from a source of drive power to left and right independently suspended wheels;
   right and left constant velocity joints connected to respective opposed ends of the drive shafts, wherein each of the constant velocity joints includes a housing forming part of the constant velocity joint;
   a case provided on a vehicle body; and
   connecting units provided on the left and right constant velocity joints for connecting the respective constant velocity joints to the case such that the constant velocity joints are removably connected to the case individually, wherein each of the connecting units includes a tubular member detachably supported by the case, a bearing fixed within the tubular member for rotatably supporting the housing and sealing members disposed on both sides of the bearing for sealing between the tubular member and the housing, and
   wherein the right and left constant velocity joints are supported by the case and designed to be individually removably connected to the vehicle body.

2. A drive power transmitting system according to claim 1, further comprising a driven sprocket to which the drive power from the drive power source is transmitted, the driven sprocket being provided astride the right and left constant velocity joints.

3. A drive power transmitting system according to claim 1, further comprising a driven sprocket to which the drive power from the drive power source is transmitted, and wherein the left and right housings are disposed in close proximity to each other and have outer peripheral portions, and the driven sprocket is detachably connected to the outer peripheral portions of the housings.

4. A drive power transmitting system according to claim 3, wherein the housings comprise cup-shaped members having the outer peripheral portions to which the driven sprocket is detachably connected, each cup-shaped housing having a bottom, each constant velocity joint having one part pivotably connected to the inside of the housing in such a manner as to allow the housing to slide relative to the one part axially, the driven sprocket having engaging areas for engaging the housings, a distance between the bottom of the cup-shaped housing and the one part of the constant velocity joint being larger than a length of each engaging area of the driven sprocket.

5. A drive power transmitting system according to claim 3, wherein the driven sprocket is provided transversely centrally of the vehicle in lined relation to a crankshaft center within the drive power source provided on the vehicle body.

6. A drive power transmitting system according to claim 3, wherein the driven sprocket has an engagement portion engageable with a tool from a lateral side thereof to retain the driven sprocket in the case when the driven sprocket is assembled to the housings.

7. A drive power transmitting system according to claim 6, wherein the engagement portion and the case have a plurality of holes, and the driven sprocket is retained in the case by insertion of the tool through the holes of the engagement portion and the case.

8. A drive power transmitting system according to claim 1, wherein the case has a lower portion supported by a pair of left and right under frames provided on the vehicle body, the drive power from the drive power source being transmitted to a driven sprocket disposed proximately to the right and left under frames and above a space defined between the under frames.

9. A drive power transmitting system according to claim 1, wherein the drive shafts are connected to a pair of left and right rear wheels, the vehicle is designed to travel on a rough terrain, and the independent suspension comprises a double wishbone independent suspension which includes upper arm members and lower arm members.

10. A drive power transmitting system according to claim 9, wherein the constant velocity joints include housings having left and right extending portions each provided at one end of the housing for supporting a driven sprocket to which the drive power from the drive power source is transmitted.

11. A drive power transmitting system according to claim 1, wherein the case comprises a left case member for connecting the left constant velocity joint to the vehicle body, and a right case member for connecting the right constant velocity joint to the vehicle body, the left and right constant velocity joints being designed to be individually removably connected to the vehicle body.

12. A drive power transmitting system according to claim 11, wherein the left and right constant velocity joints include left and right housings having left and right extending portions each provided at one end of the housing for supporting a driven sprocket to which the drive power from the drive power source is transmitted, the left and right housings being leftward and rightward slidable relative to the left and right case members, respectively, the extending portion having a length smaller than a slide distance of the housing.

* * * * *